(12) United States Patent
Spindler et al.

(10) Patent No.: US 11,225,111 B2
(45) Date of Patent: Jan. 18, 2022

(54) TIRE PRESSURE CONTROL SYSTEM AND COMPONENTS

(71) Applicants: ILLINOIS TOOL WORKS INC., Glenview, IL (US); KT PROJEKTENTWICKLUNGS GMBH, Heilbronn (DE)

(72) Inventors: Martin P. Spindler, Herdwangen (DE); Konstantinos Tsiberidis, Heilbronn (DE)

(73) Assignees: ILLINOIS TOOL WORKS INC., Glenview, IL (US); KT PROJEKTENTWICKLUNGS GMBH, Heilbronn (DE)

( * ) Notice: Subject to any disclaimer, the term of this patent is extended or adjusted under 35 U.S.C. 154(b) by 778 days.

(21) Appl. No.: 15/757,539

(22) PCT Filed: Sep. 16, 2016

(86) PCT No.: PCT/US2016/052119
§ 371 (c)(1),
(2) Date: Mar. 5, 2018

(87) PCT Pub. No.: WO2017/049075
PCT Pub. Date: Mar. 23, 2017

(65) Prior Publication Data
US 2019/0023091 A1   Jan. 24, 2019

(30) Foreign Application Priority Data

Feb. 16, 2016 (DE) .................. 10 2016 102 654.9

(51) Int. Cl.
*B60C 23/12*    (2006.01)
*F04B 35/04*    (2006.01)
(Continued)

(52) U.S. Cl.
CPC .......... *B60C 23/126* (2020.05); *B29C 73/025* (2013.01); *B60C 23/004* (2013.01);
(Continued)

(58) Field of Classification Search
CPC . B60C 23/12; B60C 23/127; B60C 23/00318; B29C 73/025; B60R 16/03;
(Continued)

(56) References Cited

U.S. PATENT DOCUMENTS 2,506,677 A * 5/1950 Mckenna ................ B60C 23/12
                                                  152/422
3,719,159 A * 3/1973 Davis .................. B60C 23/0403
                                                  116/34 R
(Continued)

FOREIGN PATENT DOCUMENTS

CN      1637281 A    7/2005
CN      2806819 Y    8/2006
(Continued)

OTHER PUBLICATIONS

China Patent Office, "Notice of First Office Action and Search Report," for Chinese Patent Application 201680082858.4, dated Aug. 12, 2019, Shanghai, China.
(Continued)

*Primary Examiner* — Scott A Browne
(74) *Attorney, Agent, or Firm* — Pauley Erickson & Swanson

(57) ABSTRACT

A compressor unit (38) for supplying pressurized medium to a tire mounted on a vehicle wheel rim (34), having a compressor (58) for exerting pressure on a fluid medium that is to be conveyed into the tire. The compressor unit (38) is dimensioned to be accommodated in a center bore (44) of the vehicle wheel rim (34) when the vehicle wheel rim (34) is in the mounted state on a wheel hub (62); and the
(Continued)

compressor (58) can be driven by a drive unit (56) positioned in the vicinity of the center bore (44) of the vehicle wheel rim (34). The compressor unit (38) is usable with a vehicle wheel rim (34) having a pressurized medium supply device (22) for a tire that is mounted on the vehicle wheel rim (34), as well as a vehicle having a vehicle wheel that includes such a vehicle wheel rim (34).

53 Claims, 16 Drawing Sheets

(51) Int. Cl.
*F04B 35/01* (2006.01)
*B60C 23/10* (2006.01)
*B60C 23/04* (2006.01)
*B29C 73/02* (2006.01)
*B60C 23/00* (2006.01)
*B60R 16/03* (2006.01)
*B60S 5/04* (2006.01)
*F04C 18/22* (2006.01)
*F04C 23/02* (2006.01)

(52) U.S. Cl.
CPC .............. *B60C 23/04* (2013.01); *B60C 23/10* (2013.01); *B60C 23/137* (2020.05); *B60R 16/03* (2013.01); *B60S 5/046* (2013.01); *F04B 35/01* (2013.01); *F04B 35/04* (2013.01); *F04C 18/22* (2013.01); *F04C 23/02* (2013.01)

(58) Field of Classification Search
CPC .......... B60S 5/046; F04C 18/22; F04C 23/02; F04B 35/04
See application file for complete search history.

(56) References Cited

U.S. PATENT DOCUMENTS

| | | | |
|---|---|---|---|
| 4,657,289 A | 4/1987 | Boyer | |
| 5,174,728 A | 12/1992 | Kimura et al. | |
| 5,325,902 A | 7/1994 | Loewe et al. | |
| 5,928,444 A * | 7/1999 | Loewe | B60C 23/004 |
| | | | 152/418 |
| 6,758,250 B2 * | 7/2004 | Cowart | B60C 17/00 |
| | | | 152/158 |
| 2004/0216806 A1 | 11/2004 | Eckhardt | |
| 2009/0283191 A1 | 11/2009 | Isono | |
| 2011/0277877 A1 * | 11/2011 | Stehle | F04B 27/0414 |
| | | | 141/38 |
| 2012/0234447 A1 * | 9/2012 | Narloch | B60C 23/004 |
| | | | 152/418 |

FOREIGN PATENT DOCUMENTS

| | | |
|---|---|---|
| CN | 201715037 U | 1/2011 |
| CN | 202707667 U | 1/2013 |
| CN | 104024007 A | 9/2014 |
| EP | 0 937 590 A1 | 8/1999 |
| EP | 1 908 612 A1 | 4/2008 |
| FR | 2 835 304 A1 | 8/2003 |
| JP | 62-4617 A | 1/1987 |
| JP | 2005-515923 | 6/2005 |
| JP | 2008-223604 | 9/2008 |
| JP | 2010-517839 | 5/2010 |
| JP | 2015-523273 A | 8/2015 |
| WO | WO 02/36369 A1 | 5/2002 |
| WO | WO 2013/037052 A1 | 3/2013 |
| WO | WO 2015/075655 A1 | 5/2015 |

OTHER PUBLICATIONS

Co-pending U.S. Appl. No. 16/068,002, "Tire Pressure Control System and Components," filed Jul. 3, 2018.

European Patent Office, English language version of a European Office Action for European Application No. 16774754.2 (EPO Forms 2001 and 2906), dated May 11, 2020 (7 pages).

Japanese Patent Office, English translation of Japanese Office Action for corresponding Japanese Patent Application No. 2018-514965, dated Jan. 19, 2021 (3 pages).

Japanese Patent Office, English translation of Japanese Office Action for corresponding Japanese Patent Application No. 2018-514965, dated Jun. 22, 2021 (3 pages).

\* cited by examiner

TIRE PRESSURE CONTROL SYSTEM AND COMPONENTS

BACKGROUND OF THE INVENTION

Field of the Invention

The invention generally relates to supplying pressurized medium to vehicle wheels and to a compressor unit that can be accommodated on or in a vehicle wheel rim in order to supply pressurized medium to a tire mounted on the rim. The invention also relates to a vehicle wheel rim with a pressurized medium supply device for a tire mounted on the rim as well as to a vehicle with at least one vehicle wheel, which includes such a rim. The invention also relates to a vehicle wheel-mounted energy supply device.

Discussion of Related Art

Vehicle tires are typically inflated with compressed air or with other pressurized mediums such as nitrogen. Vehicle tires can be embodied as tubed tires or tubeless tires and are used primarily on land vehicles such as passenger vehicles, trucks, busses, or commercial vehicles, but also in aircraft such as airplanes. Conventional vehicle tires are as a rule supplied via external connections with a pressurized medium, for example compressed air or a nitrogen filling. Usually, standardized valves are used for this.

Vehicle tires typically have an optimal operating pressure or inflation pressure that depends on the respective use conditions or operating conditions. For land vehicles, there are pressure ranges that can ensure an optimum of rolling resistance, lateral guidance, longitudinal guidance, heat build-up, and/or wear behavior. An existing actual pressure in a tire, however, can fluctuate with the ambient temperature or operating temperature. Furthermore, a certain amount of pressure loss, a so-called gradual pressure loss, over the long term cannot be entirely avoided.

There are known systems for vehicles that make it possible to monitor the operating pressure or inflation pressure in tires. In this context, it is necessary to differentiate between active and passive systems. Passive systems are embodied to determine rolling circumferences of the tires of an axle and to compare them to one another. If this reveals significant differences, then the conclusion is drawn from this that there are pressure differences between the respective tires. Active systems for measuring and/or monitoring pressure usually include sensors for pressure detection, which are integrated into a vehicle wheel. Pressure sensors of this kind can be embodied to transmit corresponding measurement signals wirelessly or by wire from the (rotating) wheel to stationary components of the vehicle.

Furthermore, there are known systems that make it possible to independently adjust the inflation pressure of vehicle tires. Systems of this kind can be found, for example, in agricultural vehicles, military vehicles, or specialized vehicles of the like. These systems can be embodied to permit adjustment of the inflation pressure at rest, i.e. when the vehicle is not moving. Systems for independent pressure regulation in vehicles have a central structure, i.e. there is a central pressurized medium supply device for inflating a plurality of tires. It is also possible to provide a plurality of pressurized medium supply devices, for example in a tractor/trailer combination; in such a case, an individual supply device is provided for inflating a plurality of vehicle wheels, particularly on different axles.

SUMMARY OF THE INVENTION

For the purpose of supplying pressurized medium, the central pressurized medium supply unit is coupled to the vehicle wheels. Usually, the supply unit is mounted to the frame, chassis, or body of the vehicle. The supply unit can, for example, include a compressor or air compressor. It is then necessary to route a plurality of pressurized medium lines leading from the supply unit to the individual vehicle wheels. In this case, it is necessary to provide a plurality of so-called rotary feed-throughs for the pressurized medium lines because the vehicle wheels are mounted in rotary fashion on axles of the vehicle.

Central compressed air supplies for vehicle tires, however, have a number of disadvantages. One basic disadvantage lies in the fact that the pressurized medium lines must bridge very long line distances. This results in a corresponding construction expense and an increased maintenance cost. A pressurized medium supply unit must also be correspondingly dimensioned and/or regulated in order to ensure the ability to provide the volumetric flow rates and pressures required to inflate the tires. Central compressed air supply units are also susceptible to leaks, in particular those that are caused by external stresses. It is also particularly difficult to achieve a reliable, durably functional embodiment of the rotary feed-throughs, which are exposed to a stress by the wheels that rotate while driving.

The aspects enumerated above result in an increased production cost, which is accompanied by a high installation expense (in original equipment installed by the vehicle manufacturer) or retrofitting expense (in the case of aftermarket installation). Some of the above-mentioned problems, particularly with regard to the long-term reliability of the systems, can only be controlled with difficulty. The prevalence of such systems is thus very limited.

In light of these circumstances, the object of the invention is to disclose a pressurized medium supply device for vehicle wheels, which can be implemented at a significantly lower cost and which in particular ensures increased reliability and long-term functionality. Preferably, it should be possible to regulate the tire pressure while driving, i.e. when the wheels are rotating. It should be possible to change a wheel or tire with as little additional expense as possible. The pressurized medium supply device should be particularly suitable for use as a retrofitting solution. It is likewise preferable if the pressurized medium supply device can also be advantageously used to repair flat tires. Preferably in this connection, it should be possible to perform a repair or temporary repair of the damage without any installation work. In addition, a suitable energy supply for the pressurized medium supply device should be ensured.

According to a first aspect of the present invention, a compressor unit for supplying pressurized medium to a tire mounted on a vehicle wheel rim is proposed, which has a compressor for exerting pressure on a pressurized medium that is to be conveyed into the tire. The compressor unit is distinguished by the fact that it is dimensioned to be accommodated in a center bore of the vehicle wheel rim when the vehicle wheel rim is in the mounted state on a wheel hub; the compressor can be driven by a drive unit positioned in the vicinity of the center bore of the vehicle wheel rim.

The compressor unit is thus dimensioned so that it fits into the installation space that is provided between the wheel hub and the vehicle wheel rim in the vicinity of the center bore of the vehicle wheel rim when the vehicle wheel rim is in the mounted state on the wheel hub. The center bore of the vehicle wheel rim is understood to be the opening provided in a central region of the vehicle wheel rim by means of which the vehicle wheel rim is slid onto the wheel hub for centering purposes. The center bore is frequently also referred to as the center opening, center hole, hub bore, or hub opening of the vehicle wheel rim.

The installation space that is available between the wheel hub and vehicle wheel rim in the vicinity of the center bore of the vehicle wheel rim can in fact be differently dimensioned depending on the vehicle and vehicle wheel rim used, but this installation space is very limited regardless of the vehicle and vehicle wheel rim used, particularly with regard to the installation space depth, and therefore offers only a small amount of space to accommodate components of any kind. In conventional vehicle wheel rims for passenger cars, the existing installation depth can, for example, be only 3 cm or even less. At the same time, the usual diameters of center bores of conventional vehicle wheel rims for passenger cars can be in the range from about 5 cm to 7.5 cm.

The above wording "is dimensioned to be accommodated in a center bore of the vehicle wheel rim when the vehicle wheel rim is in the mounted state on a wheel hub" therefore implies a very compact, as a rule very flat, structural form of the compressor unit, which differs significantly from the usual dimensioning of conventional compressors. The compressor unit in this case includes a compressor, which is suitable for exerting pressure on a fluid medium such as compressed air or nitrogen in order to convey the latter into the tire mounted on the vehicle wheel rim and thus to adjust the pressure of the tire. This simultaneous suitability for supplying pressurized medium to a vehicle tire also implies a design of the compressor unit, which despite the necessary compactness, permits a high delivery capacity that is sufficient for inflating a vehicle tire.

Since the compressor unit embodied in this way can be integrated directly into a vehicle wheel rim, in a multi-wheel vehicle, it is possible to produce a decentralized pressurized medium supply system in which each vehicle wheel has its own (possibly independently operating) pressurized medium supply device. It is thus possible to avoid using a central vehicle-mounted pressurized medium supply system, as is known from the prior art, with all the above-mentioned disadvantages thereof. Positioning the compressor unit directly in the vehicle wheel reduces the necessary length of the pressurized fluid lines for conveying the pressurized medium into the tires since these lines no longer have to be routed through the vehicle to the wheels. It is thus possible to reduce the accompanying susceptibility to leaks due to external stresses, e.g. on the underbody of the vehicle. In particular, it is also possible to entirely avoid the requirement to provide reliable, durably functional rotary feedthroughs, which can only be provided with difficulty, at the transition from the vehicle frame to the rotatable wheels. If each vehicle wheel has an independent pressurized medium supply device provided in the wheel, this also reduces the installation or retrofitting expense because the basic components required for an individual pressurized medium supply device are positioned in the vehicle wheel itself and can be removed from the vehicle along with the wheel. The compressor unit according to the invention thus makes it possible to fundamentally alter the known pressurized medium supply systems, going from a central architecture to a decentralized architecture, which is essentially based on the idea of using the narrow installation space, which is available in the vicinity of the center bore of the vehicle wheel rim when a vehicle wheel rim is mounted on a wheel hub, to accommodate a compressor unit.

In order to facilitate installation of the compressor unit in the center bore of the vehicle wheel rim, the compressor unit can be embodied as modular and can include a module housing for a precisely fitting placement in the vicinity of the center bore of the vehicle wheel rim. In the center bore of the vehicle wheel rim, a holder can also be provided, on which the module housing can be positioned in a precisely fitting way and optionally fastened. The module housing can be embodied and dimensioned so that it can be inserted like a cartridge into the center bore of the vehicle wheel rim. To this end, the module housing can have an essentially cylindrical form or can have an essentially cylindrical form over at least a large part of its longitudinal length. Given the slight depth of the installation space available for accommodating the compressor unit, the height of the thus-embodied module housing is preferably smaller than its diameter, which results in a particularly flat and compact embodiment. In the state in which it is accommodated in the center bore of the vehicle wheel rim, the compressor unit can also have a longitudinal axis that coincides with a center axis of the vehicle wheel rim. This arrangement makes it possible to minimize any imbalance during driving caused by mounting the compressor unit on the vehicle wheel rim.

In order to supply pressurized medium to the tire, the compressor of the compressor unit can be driven by a drive unit positioned in the vicinity of the center bore of the vehicle wheel rim. The drive unit can be a separate part, which is coupled to the compressor unit. The drive unit can, however, also be a part of the compressor unit and in this case, can be positioned inside the module housing. An example of a drive unit includes an electric motor. Naturally, however, it is also possible to use other types of drive unit.

The compressor can be a piston compressor with at least one piston. In order to make the most efficient possible use of the existing installation space in the vicinity of the center bore of the vehicle wheel rim, the piston can be embodied as a flat piston. If the at least one piston embodied as a flat piston is a reciprocating piston, then instead of the circular cylindrical design usually used in reciprocating pistons, it does not have a circular cross-section, but rather a for example oval or almost rectangular cross-section (with rounded corners if possible). But if the at least one piston embodied as a flat piston is a rotary piston, then its axial dimension, in relation to its rotation axis, is smaller than its radial dimension. In the compressor, the flat piston is preferably arranged in relation to a longitudinal axis of the compressor unit so that its radial dimension as a whole is greater than its axial dimension. Such an arrangement permits a particularly flat design of the compressor unit, which is advantageous primarily with regard to the small amount of installation space depth in the vicinity of the center bore of the vehicle wheel rim. A similar advantage is achieved if the at least one piston is positioned in the compressor in such a way that its movement direction, in the state in which it is accommodated in the center bore of the vehicle wheel rim of the compressor unit, extends perpendicular to a center axis of the vehicle wheel rim.

As a piston compressor, the compressor can be embodied to be driven by means of an eccentric coupling drive in which an eccentric coupling connected to a drive shaft is coupled to the at least one piston. To minimize imbalances during driving possibly caused by the compressor unit, the drive shaft can be positioned so that its longitudinal axis coincides with the center axis of the vehicle wheel rim.

In order to achieve the highest possible delivery capacities, it is also possible for the compressor to include not just one working chamber, but two of them. To that end, the compressor can have a plurality of pistons that are positioned one after another along a longitudinal axis of the compressor unit. In this case, the plurality of pistons can also be driven by means of a common drive shaft.

According to one embodiment, the at least one piston can be a reciprocating piston, which is accommodated in moving fashion in a cylinder. In order to save space, the cylinder can be composed of the module housing of the compressor unit. Also for this purpose, an intake valve and/or exhaust valve of the compressor provided for the working chamber can be at least partially embedded in the cylinder instead of positioning it as a separate part outside of the cylinder. An advantageous embodiment with regard to the intake valve of the compressor is achieved if the intake valve includes a sealing element that is mounted on the reciprocating piston and is forced open by the movement of the reciprocating piston during its intake stroke. This is accompanied not only by advantages with regard to a space-saving placement of the intake valve, which in this case, is provided not as a separate component outside of the cylinder, but is instead embodied either on the reciprocating piston itself or between the reciprocating piston and the cylinder, but also by advantages with regard to the intake volume that the reciprocating piston can achieve in a single intake stroke. By contrast with an intake valve embodied as a check valve, the opening of the intake valve does not depend on a vacuum that is produced in the working chamber by the intake stroke of the piston, but rather by the movement of the piston itself due to the fact that the sealing element of the intake valve moves along with the reciprocating piston. Thanks to the improved intake behavior, this makes it possible to increase the delivery capacity of the compressor.

For the sake of an improved sliding of the reciprocating piston inside the cylinder, the reciprocating piston can have a lubricant depot to provide the reciprocating piston with lubrication as it executes its sliding motion in the cylinder. The lubricant depot in this case can be embodied, for example, in a circumferential groove adjacent to the end wall of the reciprocating piston. The lubricant contained in the lubricant depot can be embedded in a porous or absorbent matrix, which permits a slow release of the lubricant along the sliding surfaces of the reciprocating piston.

A particularly space-saving option, primarily with regard to the sharply limited installation space depth, for providing more than one working chamber in the compressor unit lies in embodying the reciprocating piston as a double-acting piston that has two opposing piston sections, which are accommodated so that they are able to move in a cylinder. Such a piston is referred to hereinafter as a "double piston." With a reciprocating piston embodied as a double piston, it is possible to produce two working chambers with a single piston. The double piston can have a length that is a multiple of its width. It is thus possible to ensure a guidance length sufficient for the guidance precision of the respective piston/cylinder combination. It is understood that in the case of a double piston, all of the features described above with regard to the at least one piston can also relate to the piston sections formed by the double piston.

According to another embodiment that also offers a space-saving option, primarily with regard to the sharply limited installation space depth, for providing more than one working chamber in the compressor unit, the at least one piston is embodied as a rotary piston. The at least one piston can, for example, be a rotary piston embodied in the form of a Wankel rotary piston, which is able to move in rotary fashion in a compression chamber in accordance with the Wankel principle. In this case, too, rotary pistons rotating in the compression chamber can produce a plurality of working chambers, in that pressurized medium inlets and pressurized medium outlets are positioned in the compression chamber in such a way that when the rotary piston, in the course of its rotary motion, slides with its sealing lips along an (epitrochoidally shaped) circumference wall of the compression chamber, the pressurized medium that is introduced into a working chamber by a pressurized medium inlet is forced out of the working chamber through a pressurized medium outlet located after the inlet in the rotation direction.

To this end, the pressurized medium inlets and pressurized medium outlets can be positioned in the circumference wall of the compression chamber. An advantageous embodiment with regard to the pressurized medium inlets is also produced if at least one pressurized medium inlet is embodied in a side wall of the compression chamber and is covered or opened in alternating fashion by the rotary piston in the course of its rotary motion. The side wall can be one of the two side walls of the compression chamber against which the rotary piston is sealed and which delimit the compression chamber laterally. In comparison to a pressurized medium inlet embodied in the circumference wall of the compression chamber, a pressurized medium inlet of this kind prevents the sealing lips of the rotary piston, which slide along the circumference wall during the rotary motion, from becoming worn or damaged over time due to the fact that they (minimally) bump into the pressurized medium inlet opening.

An advantageous embodiment with regard to the pressurized medium outlets is also produced if at least one pressurized medium outlet from the compression chamber is routed through the rotary piston into the side wall. Here, too, the side wall can be one of the two side walls of the compression chamber. A corresponding pressurized medium outlet opening can be embodied on a side of the rotary piston oriented toward the circumference wall of the compression chamber, from which the pressurized medium outlet inside the rotary piston is routed, preferably until it reaches a central region of the rotary piston, in order to feed from there toward the outside through the side wall. In comparison to a pressurized medium outlet embodied in the circumference wall of the compression chamber, this embodiment also prevents the sealing lips of the rotary piston, which slide along the circumference wall during the rotary motion, from (minimally) bumping into the opening of the pressurized medium outlet and thus becoming worn or damaged.

For the sake of an improved sliding of the rotary piston inside the compression chamber, the rotary piston can have a lubricant depot for lubricating the rotary piston in the compression chamber. The lubricant depot can, for example, be embodied in a recess provided on a side of the rotary piston oriented toward a side wall of the compression chamber. The lubricant present in the lubricant depot can be embedded in a porous or absorbent matrix, which permits a slow release of the lubricant to the sliding surfaces of the rotary piston.

According to a second aspect of the present invention, a vehicle wheel rim is proposed, which has a pressurized medium supply device for a tire mounted on the vehicle wheel rim. The vehicle wheel rim is distinguished by the fact that the pressurized medium supply device includes a compressor unit accommodated in a center bore of the vehicle wheel rim. The compressor unit is preferably the above-described compressor unit according to the first aspect.

As explained above, in a multi-wheel vehicle, a compressor unit integrated into a vehicle wheel rim can be implemented in the form of a decentralized pressurized medium supply system in which each vehicle wheel includes its own (possibly independently operating) pressurized medium supply device.

For purposes of conveying the pressurized medium that has been pressurized by the compressor unit into the tire mounted on the vehicle wheel rim, the pressurized medium supply device can include a pressurized medium path that extends from the compressor unit to a pressurized medium inlet into the tire. The pressurized medium path can, for example, be embodied in the form of a line (for example a hose line) that is connected to a corresponding connection of the compressor unit. The pressurized medium inlet can be positioned in the vicinity of the rim well or a rim bead seat of the vehicle wheel rim in order to feed from there into the tire. Alternatively, it is also conceivable to allow the pressurized medium path to come to an end at a T-element that is coupled to a conventional tire valve of the vehicle wheel rim. In this case, the pressurized medium inlet is composed of the conventional tire valve.

A check valve can be integrated into the pressurized medium path. This valve can be provided, for example directly at the pressurized medium inlet. Naturally, however, the check valve can also be positioned at any other location in the course of the pressurized medium path between the compressor unit and the pressurized medium inlet. In order to reduce imbalances that can be caused by the weight of the check valve on the vehicle wheel, the check valve can be embodied on the compressor unit or can even be embodied as part of the compressor unit itself.

If the pressurized medium path is composed of a line, then it can be routed along a spoke of the vehicle wheel rim from the vicinity of the center bore of the vehicle wheel rim radially outward to the pressurized medium inlet. In order to protect the pressurized medium path from outside environmental influences to the greatest possible extent, the line can be routed on an inside of the vehicle wheel rim or spoke. In this regard, it can also be advantageous to route the pressurized medium path, at least in some sections, in the form of a conduit inside a spoke of the vehicle wheel rim. In such a section, the pressurized medium path is then completely protected from environmental influences.

If the pressurized medium path is routed in the form of a conduit inside the vehicle wheel rim, then it is also conceivable to dispense with a separate connection provided on the compressor unit and instead, to position the compressor unit in the center bore of the vehicle wheel rim in such a way that a pressurized medium outlet of the compressor unit and an opening of the conduit in the vicinity of the center bore of the vehicle wheel rim are flush with each other so that pressurized medium, which is under pressure, can flow out of the compressor unit and directly into the conduit. At the location of the transition from the pressurized medium outlet of the compressor unit into the opening of the conduit, a sealing element can be provided, which seals the transition.

The pressurized medium supply device of the vehicle wheel rim can also include a control module for controlling a drive unit of the compressor unit. If the drive unit of the compressor unit includes an electric motor, for example, then the control module can be embodied to control the electric motor to exert a desired amount of pressure on a pressurized medium by means of the compressor unit and to supply it to the tire via the pressurized medium path. In order to determine the amount of pressurized medium that is to be supplied to the tire, a sensor device can be positioned on the vehicle wheel rim, which sensor device is connected via a signal line to the pressurized medium supply device, in particular the control module. The sensor device can, for example, be a pressure sensor, a temperature sensor, or also both. The sensor device can also include a movement sensor, for example, which can determine whether the vehicle wheel is currently rotating or at rest. The measurement data detected by the sensor device can be transmitted via the signal line to the pressurized medium supply device or its control module and can be processed there for the purpose of determining the necessary degree of tire pressure adjustment. The signal line can also be used for supplying energy to the sensor device. For the sake of the most protected possible routing of the signal line, the signal line, at least in some sections, can be routed inside the pressurized medium path. If the check valve integrated into the pressurized medium path is not located at the pressurized medium inlet, but rather at the connection of the pressurized medium path to the compressor unit, for example, then the sensor device can be integrated into the pressurized medium path in the check valve mounted on the tire. This makes it possible to reduce imbalances in the vehicle wheel caused by the sensor device.

The control module can permit the pressurized medium supply device to independently control the supply of pressurized medium to the tire mounted on the vehicle wheel rim, for example in order to maintain the tire pressure at a preconfigured value. Naturally, however, the processing of the detected sensor measurement data can also be handled by a central control unit positioned on the vehicle. In this case, the control module can be embodied to communicate with the central control unit in order to pass the detected measurement data on to the central control unit and can be embodied to execute commands received from the central control unit, for example the triggering of the compressor unit. The communication between the control module and the central control unit in this case can be carried out wirelessly. It is also conceivable for the central control unit of the vehicle to be controlled by means of a user interface located inside the vehicle in order to permit a driver of the vehicle to input desired tire pressure settings and to have them implemented by the central control unit even while driving.

A pressurized medium supply device that can be controlled in this way basically renders the tire valves that are usually positioned on the outside of the rim in conventional vehicle wheel rims superfluous. For esthetic reasons, it is therefore conceivable to dispense with providing a tire valve on the outside of the vehicle wheel rim. But in order to nevertheless be able to carry out an inflation of the tire in the event of a failure of the pressurized medium supply device, a tire valve, which can be connected to an external pressurized medium source, can be coupled to the pressurized medium path. This tire valve can preferably be embodied so that it is not visible from the outside of the rim. For example, the tire valve can be positioned on the inside of a spoke in which the pressurized medium path is also routed. It is also conceivable to position the tire valve in the region around the center bore of the vehicle wheel rim, behind a hub cover, so that the tire valve is accessible from the outside when the hub cover is removed.

In order to supply the pressurized medium supply device with the necessary energy (e.g. to drive an electric motor-driven compressor unit, to operate the control module, or to supply the sensor device with energy), an energy storage device such as a battery or accumulator can be positioned on the vehicle wheel rim. The energy storage device can be accommodated, for example together with the compressor unit, in the vicinity of the center bore of the vehicle wheel rim. But since an energy storage device only ensures a limited service life of the pressurized medium supply device, the pressurized medium supply device can also be supplied with energy from a vehicle-mounted energy source when the vehicle wheel rim is in the mounted state on a wheel hub of the vehicle. Specific measures for implementing an energy supply of this kind are described further below in the context of a vehicle wheel-mounted device for supplying energy. In order to be able to continue operating the pressurized medium supply device even in the event of a failure of the vehicle-mounted energy source, it is also possible for a connection, via which the pressurized medium supply device can be supplied with energy and which can be connected to an external energy source, to be positioned, for example, in the vicinity of the vehicle wheel rim. Such a connection can, for example, be positioned in the vicinity of the center bore of the vehicle wheel rim, behind a hub cover, so that the connection is accessible from the outside when the hub cover is removed.

In order to be able to maintain the drivability of the tire even in the event of a flat tire or other damage to the tire that results in a pressure loss, the pressurized medium supply device can include a sealant reservoir for storing a tire sealant. The sealant reservoir can be positioned in different locations on the vehicle wheel rim that are suitable for this purpose. For example, it is conceivable for the sealant reservoir to be an annular chamber positioned in the center bore of the vehicle wheel rim, encompassing the compressor unit. Alternatively, the sealant reservoir can, for example, be a cavity in a spoke of the vehicle wheel rim. An on/off valve such as a multi-port valve, which can be controlled by the control module, for example, can be integrated into the pressurized medium path via which the tire sealant can be conveyed from the sealant reservoir into the pressurized medium path. Alternatively, the pressurized medium supply device can also include a separate sealant path, which extends from the sealant reservoir to a sealant inlet into the tire. In this case, an on/off valve can also be provided to convey the pressurized medium, which has been pressurized by the compressor unit, into the sealant reservoir and to push the tire sealant contained in the sealant reservoir into the tire.

According to a third aspect of the present invention, a vehicle is proposed, which has at least one vehicle wheel that includes a vehicle wheel rim with a pressurized medium supply device for a tire mounted on the vehicle wheel rim. The vehicle wheel rim can be the above-described vehicle wheel rim according to the second aspect. The vehicle can include a control unit (that corresponds to the above-described central control unit) in which the pressurized medium supply device of the vehicle wheel rim of the at least one vehicle wheel can be controlled by the control unit positioned in the vehicle.

According to a fourth aspect of the present invention, a device for supplying electrical energy to an electrical component positioned on a vehicle wheel is proposed in which the vehicle wheel is supported in rotary fashion on a wheel carrier of a vehicle. The device features an energy collecting element, which is positioned on a part that is supported in rotary fashion on the wheel carrier and into which the electrical energy can be fed through a cooperation with the vehicle-mounted part, and a supply line that is routed from the energy collecting element to the electrical component.

The supplying of electrical energy into the energy collecting element through the cooperation between the rotatably supported part and the part affixed to the vehicle can take place in an inductive or capacitive fashion, by generator, or through mechanical contact. The energy transmission can include a direct current transmission or an alternating current transmission. The energy transmission can include a direct current/alternating current conversion or vice versa.

In the event of an inductive or capacitive energy supply, the energy collecting element can include a receiving element that is suitable for inductive or capacitive coupling and the vehicle-mounted part can be provided with a transmitting element that is suitable for the inductive or capacitive coupling; via these elements, electrical energy can be fed from a vehicle-mounted energy source into the energy collecting element. If the vehicle wheel is mounted on a wheel hub that is supported in rotary fashion on the wheel carrier, then the receiving element and the transmitting element can, for example, be embodied on opposing circumference surfaces of the wheel carrier and the wheel hub. If the wheel carrier encompasses the wheel hub on an axial section with reference to a longitudinal axis of the wheel carrier, then in this section, the receiving element can be embodied circumferentially on the outer circumference surface of the wheel hub and the transmitting element can be embodied circumferentially on the inner circumference surface of the wheel carrier. A reverse arrangement is conceivable if the wheel hub encompasses the wheel carrier. In another example, the transmitting element can be embodied as a block, which is fastened, for example, to the brake caliper in the space radially inside the rim well of a vehicle wheel rim belonging to the vehicle wheel, and the receiving element can be embodied as a disc, which is positioned on the inside of the vehicle wheel rim, extending radially relative to the center axis of the vehicle wheel rim, and reaching radially to the block.

In the event that energy is supplied by generator, the energy collecting element can include a rotor, which cooperates with a stator positioned on the part that is affixed to the vehicle and together with it, constitutes a generator device that produces electrical energy when the vehicle wheel rotates around the wheel carrier, which energy is fed into the energy collecting element. If the vehicle wheel is mounted on a wheel hub that is supported in rotary fashion on the wheel carrier, then the rotor and stator can, for example, be positioned opposite each other on the wheel carrier and wheel hub. If the wheel carrier encompasses the wheel hub on an axial section relative to the longitudinal axis of the wheel carrier, then the rotor can be positioned in the section on the wheel hub and can be encompassed in annular fashion by a stator embodied on the wheel carrier. A reverse embodiment is also conceivable, for example if the wheel hub encompasses the wheel carrier.

In the event of an energy supply through mechanical contact, the energy collecting element can include a sliding contact that touches a stationary contact in sliding fashion, which stationary contact is positioned on the part that is affixed to the vehicle, so that electrical energy can be fed from a vehicle-mounted energy source into the energy collecting element. If the vehicle wheel is mounted on a wheel hub that is supported in rotary fashion on a wheel carrier, then the sliding contact can be produced, for example, at opposing circumference surfaces of the wheel carrier and the wheel hub. If the wheel carrier encompasses the wheel hub on an axial section relative to a longitudinal axis of the wheel carrier, then in this section, a sliding contact can be positioned on the outer circumference surface of the wheel hub that touches a corresponding circumferential contact surface in sliding fashion, which contact surface is provided on the inner circumference surface of the wheel carrier. A reverse arrangement is conceivable if the wheel hub encompasses the wheel carrier. Slip rings or carbon brushes, for example, can be used to produce the sliding contact.

The electrical component to be supplied with electrical energy can be an energy-consuming or energy-storing component. An energy-storing component such as an accumulator can be connected upstream of an energy-consuming component. The interposition of an energy-storing component can in particular be advantageous if the energy supply is carried out exclusively by generator since otherwise, no energy would be available when the vehicle was at rest. In the case of an inductive energy transmission or an energy transmission through mechanical contact, an interposed energy-storing component can also be advantageous, particularly when the vehicle-mounted energy source is temporarily unavailable (e.g. due to a failure). If the supply line is routed directly to an energy-consuming electrical component, then the energy-consuming component can be supplied with energy without an interposed energy-storing component.

The energy-consuming component can, for example, be a sensor device mounted on the vehicle wheel, which is embodied to transmit measurement data to a control unit positioned in the vehicle. The sensor device can be the sensor device described further above. The energy-consuming component can include an electric motor-driven compressor unit for supplying pressurized medium to a tire mounted on the vehicle wheel and can also include an associated control module. The compressor unit and the control module can be the compressor unit described further above and the associated control module of the rim-mounted pressurized medium supply device mounted, which is also described further above.

Essential advantages of the energy supply device according to the invention include on the one hand, the fact that wheel-mounted components that require a large supply of energy (e.g. the electric motor-driven compressor unit) can be easily supplied with a sufficient amount of energy. On the other hand, an advantage also lies in the fact that not only an intermittent, but also a continuous operation of the wheel-mounted energy-consuming components is enabled. The latter case is particularly relevant for wheel-mounted sensor devices. Known wheel-mounted sensor devices such as active sensors of a TPMS system (tire pressure monitoring system) are usually produced with a permanently integrated energy source that is designed for a service life of several years. An operating time of this length, however, is only achieved if the sensors are only briefly active over longer periods of time and then transmit the data detected at a measurement time to a control unit. The energy supply device described here, however, enables a wheel-mounted sensor device to perform a continuous measurement and thus to establish a continuous data flow between the sensor device and a vehicle-mounted control unit. In this way, it is possible to collect extensive, valuable data for the telematics of a vehicle.

According to another aspect of the present invention, a use of the energy supply device is proposed for operating a sensor device positioned on the vehicle wheel and for transmitting measurement data of the sensor device to a control unit positioned in a vehicle. The sensor device in this case can be operated continuously and can continuously transmit measurement data to the control unit (e.g. for the duration of a trip or for a predefined period of time, which can also include a time at which the vehicle is at rest).

Another advantage in comparison to active sensors of a TPMS system is achieved through an improved imbalance behavior of the vehicle wheel. Active TPMS sensors are usually installed as a unit together with a tire valve, with permanently integrated electronics and an energy source, and in conventional vehicle wheel rims, are mounted close to the rim bead seat. Thanks to the energy supply device described here, it is no longer necessary to provide the energy source on the sensor connected to the tire valve and as a result, a weight reduction of the sensor is achieved, which improves the imbalance behavior of the vehicle wheel.

According to another aspect of the present invention, a use of the energy supply device is also proposed for driving an electric motor-driven compressor unit for supplying pressurized medium to a tire mounted on a vehicle wheel.

For the above-mentioned transmission of measurement data of the sensor device to a control unit positioned in a vehicle, according to another aspect, a system can be provided for contactless data transmission, which is embodied to transmit data between a static (i.e. vehicle-mounted) vehicle component and a dynamic (i.e. rotatable) vehicle component (e.g. a vehicle wheel). The data transmission system can in particular be embodied for (chronologically) continuous data transmission.

The data transmission system can, for example, be a two-way data transmission system, which has at least one transceiver unit associated with the static vehicle component and at least one transceiver unit associated with the dynamic vehicle component. The transceiver unit of the dynamic vehicle component can be embodied to receive data from sensor system associated with the dynamic vehicle component, in particular a real-time sensor system, and preferably to continuously transmit them to the transceiver unit of the static vehicle component.

The transceiver unit of the dynamic vehicle component can be embodied as a separate unit, in particular as a unit that is physically separate from the sensor system. It is thus possible to position the transceiver unit of the dynamic vehicle component separately from the corresponding sensor system in a preferred position, for example on the rim contour of a vehicle wheel. In one embodiment, the transceiver unit of the dynamic vehicle component can also be embodied to receive data for controlling at least one controllable component associated with the dynamic vehicle component and to correspondingly transmit this data to the controllable component.

The transceiver units of the contactlessly functioning data transmission system, by contrast with conventional systems such as wheel-mounted tire pressure sensors with transmitter units in the tire, can be positioned in an installation space of the dynamic vehicle component, which is advantageous for the data transmission speed and data transmission quality, preferably in locations with the least possible amount of disturbance variables that can be caused by obstacles such as the rim and/or tire. For example, a transceiver unit can be mounted in a preferred position on a rim contour, with a continuous energy supply to the transceiver unit being provided by means of a direct or indirect connection to an energy supply (e.g. the above-described energy supply device).

As compared to conventional one-way communication solutions (transmitters of tire pressure/temperature information through TPMS, without the possibility of the vehicle responding to the sensor system), the data transmission system enables various value-added functions based on a two-way communication. It is thus possible, for example based on the possibility of continuous transmission of sensor data to a vehicle-mounted receiver, to achieve higher data rates. As a result, a higher data quantity with a higher data quality can be exchanged between the static vehicle component and the sensor system on the dynamic vehicle component (e.g. on or in the tire). Through the possibility of the dynamic vehicle component (e.g. vehicle wheel) receiving data from control electronics in the vehicle, other potential uses become apparent, for example to control components on the dynamic vehicle component, e.g. to trigger a wheel-mounted pressure generating source (for example one of the above-described compressor units).

The data transmission system enables implementation of a continuous data flow, making it possible to carry out safety and convenience measures in real time by means of (central) vehicle electronics based on a continuous monitoring of various states of the dynamic vehicle component. Systems that have been known up to this point have not been able to maintain a continuous transmitting operation over a longer period of time because of the limited availability of energy (e.g. due to low battery capacities) and the sometimes extreme working temperature conditions.

On the whole, the above-described data transmission system offers an extremely wide variety of potential uses, which can increase the driving safety and driving comfort of a vehicle. For example, it is conceivable to use the data from the tire sensors to network driver assistance systems and systems for autonomous or partially autonomous driving. In another example, the identity of the tire, together with all of the dimensions, the load-carrying capacity, and the speed index, can be stored in the sensor system and at temperatures for example in the vicinity of 4° C., the driver can be alerted that the tires should be changed to winter tires. According to another example, in a case in which the maximum reliable speed of the tire has been exceeded, an acoustic or visual warning can conceivably be output to the driver. Also, the question as to what is the maximum load of a vehicle can be quickly and precisely answered with the data of the tire sensors, which is also true of the question as to whether the existing air pressure permits fuel-efficient and safe driving. The real-time sensor system can in particular ensure increased safety, since it uses information from driving dynamics sensors and can evaluate it together with other information that can be received from additional environmental and tire sensors. The driver can, for example, be sent a warning as soon as the adhesion limit between the tire and road has been reached. It is thus conceivable to detect nascent aquaplaning and to send a corresponding warning signal to the driver. In this connection, the processing of information from environmental sensors and a plausibility testing based on thermometer measurement values make it possible to detect road conditions and warn the driver of impending problems with regard to tire grip. By means of real-time sensors, it is also possible to supply information about the current tire deformation during rolling.

It is understood that the features mentioned above and explained in greater detail below can be used not only in the respectively indicated combination, but also in other combinations or by themselves without going beyond the scope of the present invention.

BRIEF DESCRIPTION OF SEVERAL VIEWS OF THE DRAWINGS

Other features and advantages of the invention ensue from the following description of a plurality of preferred exemplary embodiments taken in conjunction with the drawings. In the drawings:

FIG. 8b shows a perspective view of the compressor unit shown in FIG. 8a;

FIG. 10b shows a longitudinally sectional view of the compressor shown in FIG. 10a;

DETAILED DESCRIPTION OF THE INVENTION

Figure 1:
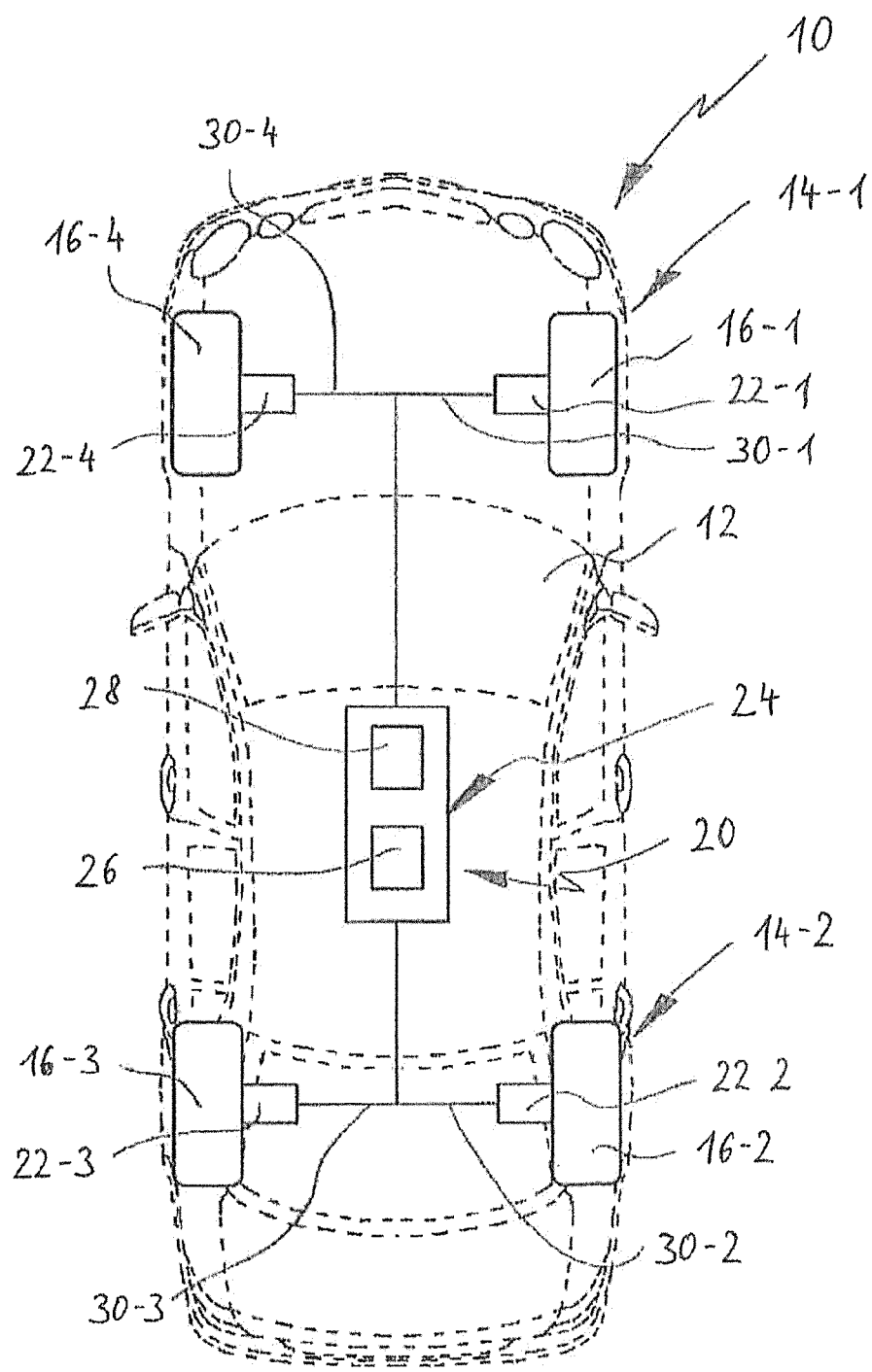
FIG. 1 shows a schematic, highly simplified top view of a vehicle, which is provided with a pressurized medium supply system.

FIG. 1 shows a schematic, highly simplified top view of a vehicle 10, which is depicted as a passenger car, for example. It is understood that the vehicle 10 can alternatively also be embodied as a commercial vehicle, as a land vehicle in general, or as an aircraft (e.g. as an airplane with landing gear). A chassis or body 12 of the vehicle 10 is shown with dashed lines.

The vehicle 10 has two axles 14-1, 14-2, which are spaced apart from each other in a longitudinal direction of the vehicle. The vehicle 10 shown in FIG. 1 is indeed a two-axle vehicle for example, but it is understood that the vehicle 10 can also be a differently designed multi-axle vehicle (e.g. a truck with three or four axles) or also a single-axle vehicle (e.g. a trailer or the like). It is also understood that the vehicle 10 does not absolutely have to be a driven vehicle, but can also be a pushed or pulled vehicle, in particular a trailer, a semi-trailer, or the like. The vehicle 10 shown in FIG. 1 is also embodied in the form of a two-track vehicle. The present invention, however, can also relate to other multi-track or single-track vehicles (e.g. motorcycles, light motorcycles, or the like). The vehicle 10 has four vehicle wheels 16, two of which are associated with each of the axles 14-1, 14-2. In clockwise order, the vehicle wheels are labeled with the reference numerals 16-1, 16-2, 16-3, and 16-4.

The vehicle 10 has an integrated (on-board) pressurized medium supply system 20, which in FIG. 1 is depicted only in schematic fashion in the form of a block. The pressurized medium supply system 20 includes a plurality of distributed pressurized medium supply devices 22, which are likewise depicted in only schematic fashion. In particular, each vehicle wheel 16 (or wheel set) is associated with a pressurized medium supply device 22. The first wheel 16-1 is associated with a first pressurized medium supply device 22-1, the second wheel 16-2 is associated with a second pressurized medium supply device 22-2, the third wheel 16-3 is associated with a third pressurized medium supply device 22-3, and the fourth wheel 16-4 is associated with a fourth pressurized medium supply device 22-4.

In the pressurized medium supply system 20, the pressure generation is decentralized. The vehicle wheels 16 include tires, which can be inflated with a pressurized medium such as compressed air or nitrogen. In order to control, regulate, and adjust the pressure level in the tires of the vehicle wheels 16, each of the pressurized medium supply devices 22 is provided with its own compressor unit for supplying the pressurized medium to the relevant tire. Consequently, no central supply of pressurized medium takes place so that the pressurized medium supply system 20 does not require a central compressor or compressed air reservoir. As explained at the beginning, this decentralized architecture makes it possible to avoid a higher implementation cost for compressed air lines, particularly at the transition from the chassis 12 to the vehicle wheels 16.

A central control unit 24 of the pressurized medium supply system 20 can be coupled directly or indirectly to the pressurized medium supply devices 22. This is primarily provided for purposes of electrical energy transmission or information exchange and for control purposes. For example, the control unit 24 includes a signal processing unit 26 and an energy storage device 28 or is coupled to such units. The control unit 24 can, for example, be coupled to a main energy storage device (main battery) of the vehicle 10. Alternatively, it is conceivable to provide separate energy storage devices 28 for the control unit 24.

The signal processing unit 26 can be embodied as part of an overriding vehicle control system or can alternatively be embodied as a separate module. The control unit 24 can be embodied to monitor a state of the vehicle wheels 16, in particular their tires, in order to determine if they need pressurized medium. This can be achieved through a direct or indirect tire pressure monitoring in the wheels 16. The control unit 24 can also be embodied to control the compressor unit(s) of one or more pressurized medium supply device(s) 22 in order to achieve a desired pressure in the tires of the wheels 16.

Alternatively or in addition, the pressurized medium supply devices 22 can also be embodied to independently maintain a particular target state relating to the pressure in the tire of a vehicle wheel 16. In this operating state, no external control commands from the control unit 24 would be required. There are also conceivable mixed forms in which on the one hand, central control signals are produced for the pressure regulation and on the other hand, an at least partially decentralized independent regulation is enabled, for example as part of an emergency operation.

In the example shown in FIG. 1, electrical lines 30 are routed from the control unit 24 to the vehicle wheels 16. The lines 30 can be embodied as electrical lines and in particular, can be embodied to transmit energy to the pressurized medium supply devices 22 on the vehicle wheels 16, where the energy transmission at the transition to the vehicle wheels 16 can be implemented in an inductive or capacitive way or by means of mechanical contact. Alternatively or in addition, the lines 30 can also be embodied to transmit information, signals, measurement values, parameters, or the like. It is naturally also possible to embody several respective lines 30 leading to a vehicle wheel 16 for the purposes of transmitting energy and information. In the example shown in FIG. 1, the control unit 24 is connected via a first line 30-1 to a first pressurized medium supply device 22-1, is connected via a second line 30-2 to a second pressurized medium supply device 22-2, is connected via a third line 30-3 to a third pressurized medium supply device 22-3, and is connected via a fourth line 30-4 to a fourth pressurized medium supply device 22-4.

The pressurized medium supply system 20 is embodied to perform adjustments to the pressure in the tires of the wheels 16 even during operation of the vehicle 10. It is therefore unnecessary to slow or stop the vehicle 10 in order to adjust the pressure in the tires. Instead, the pressurized medium supply devices 22 can be embodied with the ability to perform adjustments to the tire pressure even during a relative rotation between the vehicle wheels 16 and the axles 14 of the vehicle.

The control unit 24 of the pressurized medium supply system 20 can also be embodied to detect pressure losses in the tires; the detection can also include a detection of tire damage. To this end, a defined pressure drop over a certain amount of time can be used as a threshold value for a flat tire or tire damage.

In addition, the pressurized medium supply system 20 can be embodied to monitor a pressure in the tires of the wheels 16 over the long term. It is thus possible to detect and compensate for seasonal (temperature-induced) pressure fluctuations, for example, or for a natural pressure drop in the wheels 16 over time. Another use for the pressurized medium supply system 20 can be for a selective adjustment of the pressure in the wheels 16. It is thus possible to react, for example, to various load states, axle loads, road conditions, weather conditions, or the like.

Figure 2:
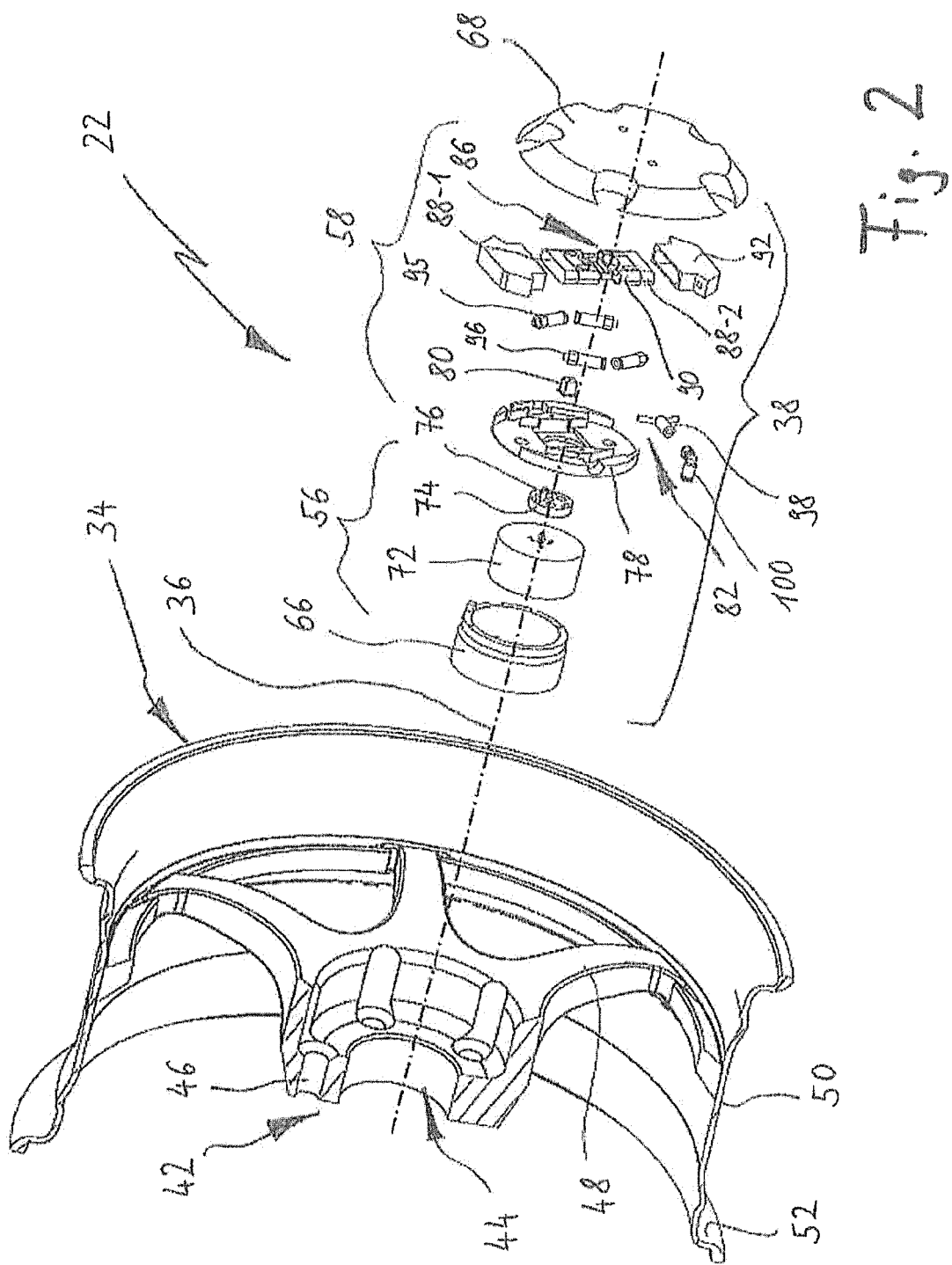
FIG. 2 shows a perspective, exploded view of a compressor unit, which can be accommodated on or in a (sectionally depicted) rim.

Referring to FIG. 2 and also referring to FIGS. 3, 4, and 5, an embodiment of a vehicle wheel 16 provided with a pressurized medium supply device 22 will be clarified in greater detail below.

FIG. 2 shows a perspective, exploded view of a pressurized medium supply device 22, which can be mounted on a rim 34 of a vehicle wheel 16. In particular, the part of the pressurized medium supply device 22 shown in FIG. 2 can be embodied and oriented essentially coaxial to a center axis 36 of the wheel 16 or rim 34. Chiefly, the pressurized medium supply device 22 includes a compressor unit 38, which has a compressor for supplying pressurized medium or compressed air. The compressor unit 38 can be at least partially accommodated in a center bore 44 in a central region 42 of the rim 34, preferably in a recessed fashion. In other words, the compressor unit 38 is accommodated in a region of the rim 34 that is provided anyway for the centering of the wheel 16 on a wheel hub and that is usually situated inside a circumference defined by the lug bolt sockets 46. It is thus possible to integrate the compressor unit 38 almost invisibly into the rim 34 or wheel 16.

The rim 34, which is shown by way of example, also has a plurality of arms or spokes 48 that connect the central region 42 to a tire seat, which is formed by a rim well 50 and the adjacent rim bead seats 52. Between the rim bead seats 52, a tire 54 is accommodated, which is oriented toward the rim well 50 (see FIG. 3). The rim well 50 constitutes a part of the outer circumference surface of the rim 34.

The concentric embodiment of the compressor unit 38 and in particular, its placement in the central region 42 of the rim 34 avoids eccentric mass accumulations. This can contribute to the fact that the integration of the compressor unit 38 is not accompanied by an increase, at least not a significant increase, in a (static or dynamic) imbalance of the wheel 16. Preferably, essential components of the compressor unit 38 are embodied as rotationally symmetrical to the center axis 36.

In conventional passenger cars, the center bore 44 has a diameter of approximately 5 cm to 7.5 cm. This installation space is often provided anyway since this diameter is usually used for centering the rim 34 or wheel 16 on a wheel hub. In addition, the center bore 44 is often used to accommodate emblems, hub covers, or the like, which can for example also cover lug bolts and usually serve esthetic purposes or also provide protection from environmental influences. Preferably, the compressor unit 38 is therefore embodied as cylindrical (possibly even mushroom-shaped) and uses the installation space, which is provided by the center bore 44 and, in conventional rims or wheels, is covered by a covering cap, for example. Consequently, viewed from the outside, an almost invisible integration of the compressor unit 38 can be achieved.

In the example shown in FIG. 2, the compressor unit 38 of the pressurized medium supply device 22 has a drive unit 56 and a compressor (or compressor section) 58. The drive unit 56 includes a motor 72 that is embodied as an electric motor. It is understood that the drive unit can also be embodied differently and in particular, does not have to be a part of the compressor unit 38. It is thus conceivable to provide a separate drive unit in the vicinity of the center bore 44 of the vehicle wheel rim 34 to which the compressor unit 38 can be coupled. The compressor 58 constitutes the part of the compressor unit 38 in which a pressurized medium (usually air) is taken in, pressurized, and output in a defined way.

Figure 3:
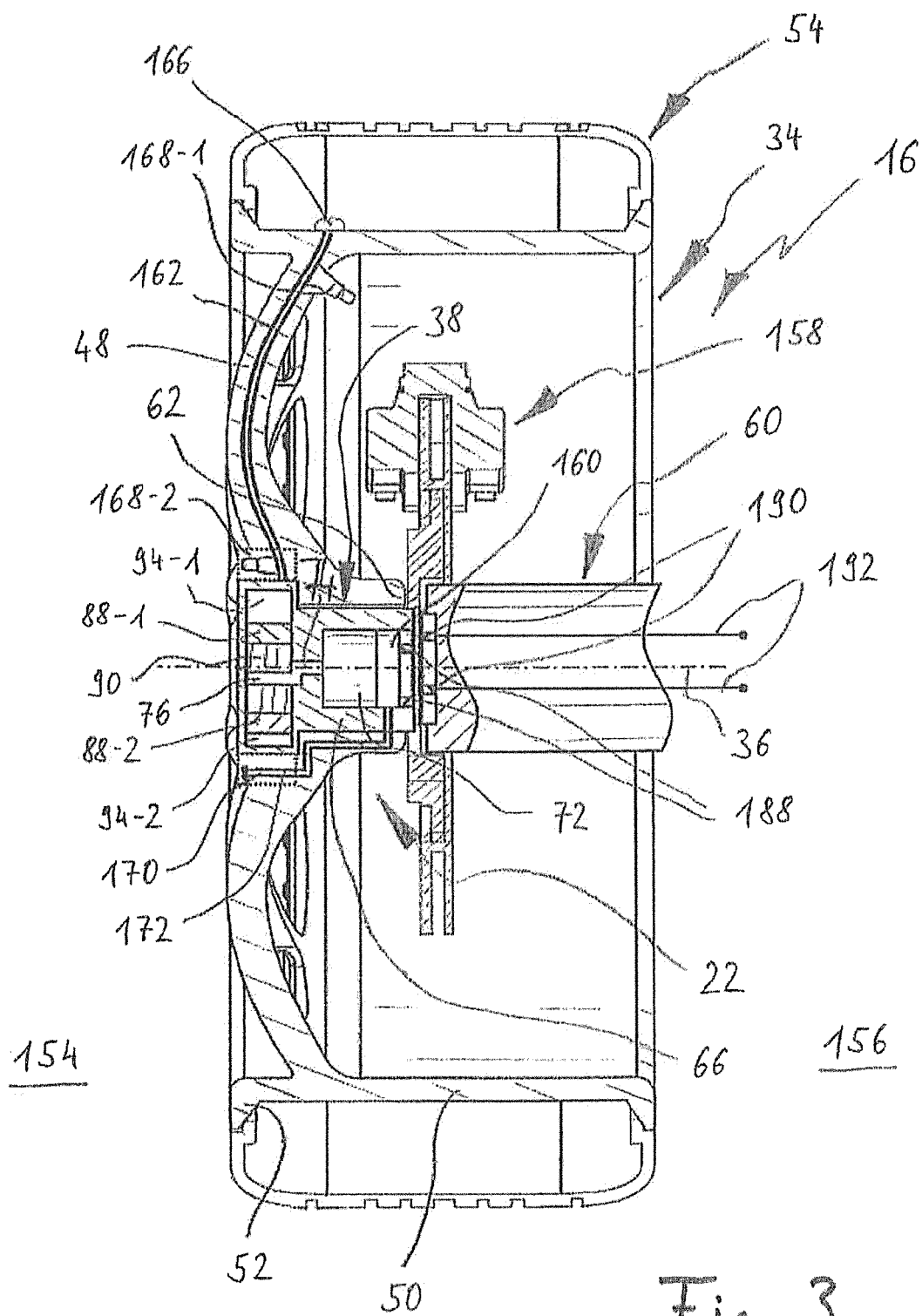
FIG. 3 shows a longitudinal section through a vehicle wheel, which is mounted on a wheel carrier, in which the vehicle wheel is associated with a pressurized medium supply device.

The vehicle wheel rim 34, together with the compressor unit 38 accommodated in the center bore 44, can be mounted via a wheel hub to a vehicle-mounted wheel carrier 60 (see FIG. 3). The wheel carrier 60 can also be referred to as an axle journal. The wheel carrier 60 is mounted to the chassis 12 of the vehicle 10 and in particular, is not able to rotate around the center axis 36 relative to the vehicle 10. While the vehicle 10 is driving, the wheel 16 rotates on the wheel carrier 60. Between the wheel carrier 60 and the vehicle wheel 16, a wheel bearing is usually provided (not separately shown in FIG. 3). The mounting of the vehicle wheel 16 on the wheel carrier 60 is carried out indirectly by means of a wheel hub 62, which usually has a centering diameter that is adapted to the diameter of the center bore 44. The wheel hub is only indicated by the reference numeral 62 in FIG. 3.

In FIG. 3, it is clear that the compressor unit 38 uses an installation space, which the rim 34 provides anyway and which is situated between the wheel hub 62 and the rim 34. Preferably, the radial dimension (i.e. the diameter) and the axial dimension of the compressor unit 38 are adapted to the central region 42 or the center bore 44 of the rim 34.

With regard to the depiction in. FIG. 3, it should be noted that the sizes of the components shown do not necessarily correspond to the actual dimensions. For example, the compressor unit 38 is relatively large, particularly with an oversized axial length, in order to provide a clearer view of the components shown.

The compressor unit 38 is embodied in modular fashion and has a module housing 64 (see FIGS. 3 and 4), which is generally referred to as a module holder. In the exemplary embodiment shown in FIG. 2, the module housing 64 is composed of an inward-facing cup 66 and an outer closing cap 68. The cup 66 and the closing cap 68 enclose the components of the compressor unit 38 (in particular, see the detailed depictions in FIGS. 4 and 5). Preferably, the cup 66 has an outer diameter, which is adapted to the center bore 44 of the rim 34 so that the module housing 64 (composed of the cup 66 and the closing cap 68) can be integrated into the center bore 44 in a precisely fitting way. The closing cap 68 can for example be embodied analogously to known hub caps or hub covers for rims 34 and can, for example, carry a brand emblem or the like.

In the exemplary embodiment shown, the cup 66 contains a motor 72 that drives a drive shaft 74. The motor 72 can be coupled indirectly or directly to drive shaft 74. Thus for example, at least one transmission stage can be connected between them. In the exemplary embodiment shown, though, this is not the case since the motor 72 is coupled directly to the drive shaft 74. In the example shown, the drive shaft 74 is embodied as disc-shaped and has an eccentric coupling or cam section 76. The eccentric coupling 76 extends in an orbit around the center axis 36. A drive end of the motor 72, in particular the drive shaft 74, extends through an end plate 78, which is positioned between the cup 66 and the closing cap 68. The drive shaft 74 can be accommodated in rotary fashion in the end plate 78.

For example, a slider is accommodated on the eccentric coupling 76, with the eccentric coupling 76 and slider 80 being part of an eccentric coupling drive 82. The eccentric coupling drive 82 connects or couples the drive unit 56 and the compressor 58. In the example shown, the compressor 58 is a piston compressor that has a piston assembly 86, which is embodied for example as a double piston (i.e. as a double-acting piston). The eccentric coupling drive 82 is connected to the piston assembly 86. The piston assembly 86 includes two opposing pistons or piston sections 88 (more precisely labeled with the reference numerals 88-1 and 88-2), which are rigidly connected to each other by means of a drive element 90. The slider 80 is coupled to the drive element 90 in order to drive the latter in translatory fashion. The eccentric coupling drive 82 is embodied to convert a rotary motion of the motor 72 into a reciprocating motion of the piston sections 88. The piston sections 88 are accommodated in cylinders embodied in the form of cylinder caps 92 and together with the cylinder caps 92, constitute working chambers 94 (see cylinder caps 92-1 and 92-2 and the associated working chambers 94-1 and 94-2 in FIG. 4).

In the exemplary embodiment in FIGS. 2 through 5, the piston assembly 86 is embodied as a flat piston with a non-circular cross-section. This can be accompanied by advantages with regard to the installation space and, particularly with regard to the center axis 36 of the rim 34, can limit the amount of installation space required for the compressor unit 38 in the axial direction. Naturally, however, there are also conceivable piston assemblies and cylinders with a circular cross-section. But since the compressor unit 38 is usually only required to regulate or readjust the tire pressure and in particular, is not necessarily operated in continuous fashion, piston/cylinder combinations with non-circular cross-sections are easily sufficient and at the same time, also save space.

The piston/cylinder combinations shown in FIGS. 2 through 5 do not have a classic crank mechanism (connecting rod arrangement). Instead, the conversion of the rotary drive motion into the translatory reciprocating drive motion is carried out by means of the eccentric coupling drive 82. Since the piston sections 88-1 and 88-2 embodied as a double piston are rigidly connected to each other by means of the drive element 90 and the double piston therefore has a length that is a multiple of its width, this ensures a sufficient guidance length and guidance precision of the piston/cylinder combination. The eccentric coupling drive 82 is embodied in such a way that only a reciprocating component of the eccentric revolution of the eccentric coupling 76 is transmitted via the slider 80 to the piston assembly 86. A lateral component (perpendicular to the reciprocation direction) of the revolving motion of the eccentric coupling 76 "evaporates" so to speak. In this way, a reciprocating motion can be produced in a simple way without complex bearings.

The pistons 88 and the cylinders 92 cooperate in order to selectively draw a pressurized medium (in particular air) into the working chambers 94 and output it in a compressed state. In the example shown, the compression procedure is controlled by means of check valves 95 and 96, which are coupled to the working chambers 94; during an expansion movement or intake stroke, these check valves permit an intake of the pressurized medium and during a compression movement or compression stroke, they permit a compression and a defined output. One advantage of the double piston embodiment shown in FIGS. 2 through 5 lies in the fact that the piston sections 88-1 and 88-2 are coupled to each other in such a way that one of the working chambers 94-1 and 94-2 is always being either compressed or expanded so that on the whole, a smoother pressurized medium output with larger total volumetric displacement is ensured. For example, outlet-side check valves 96-1 and 96-2 are connected to each other by means of a connector 98 and are coupled to a pressurized medium path (reference numeral 162 in FIG. 3) leading to the tire 54. FIGS. 2 and 5 also indicate an optional pressure element 100 for deflecting the pressurized medium path.

Figure 4:
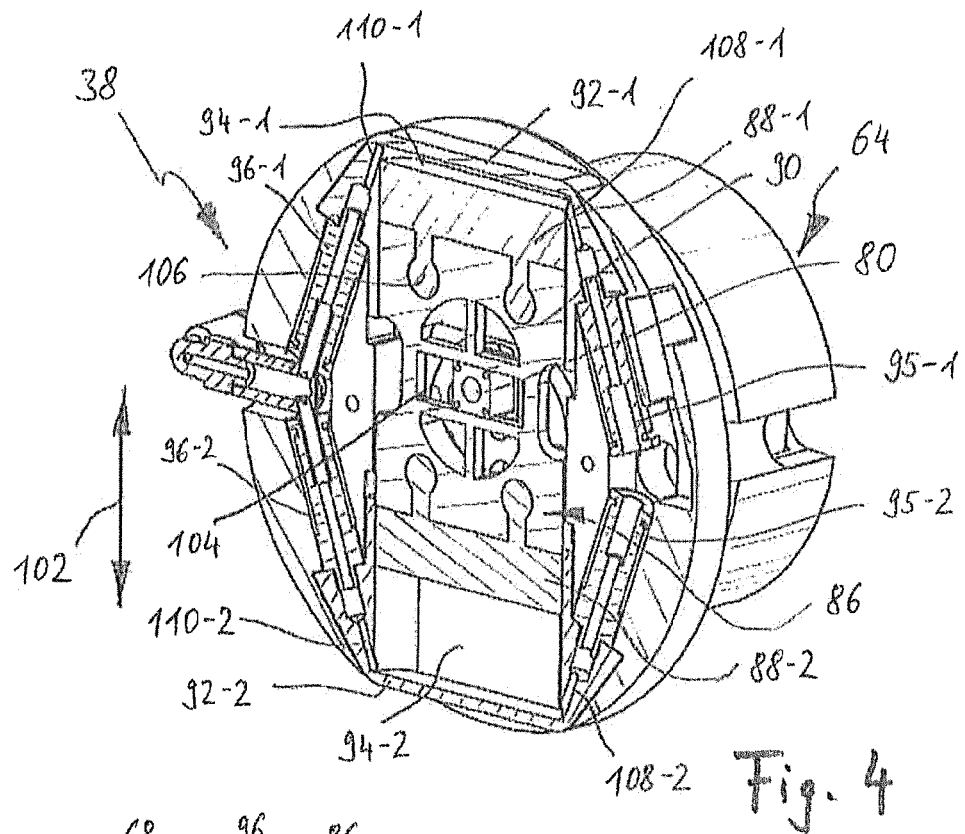
FIG. 4 shows a frontal, sectional, perspective view of the compressor unit according to FIGS. 2 and 3.
Figure 5:
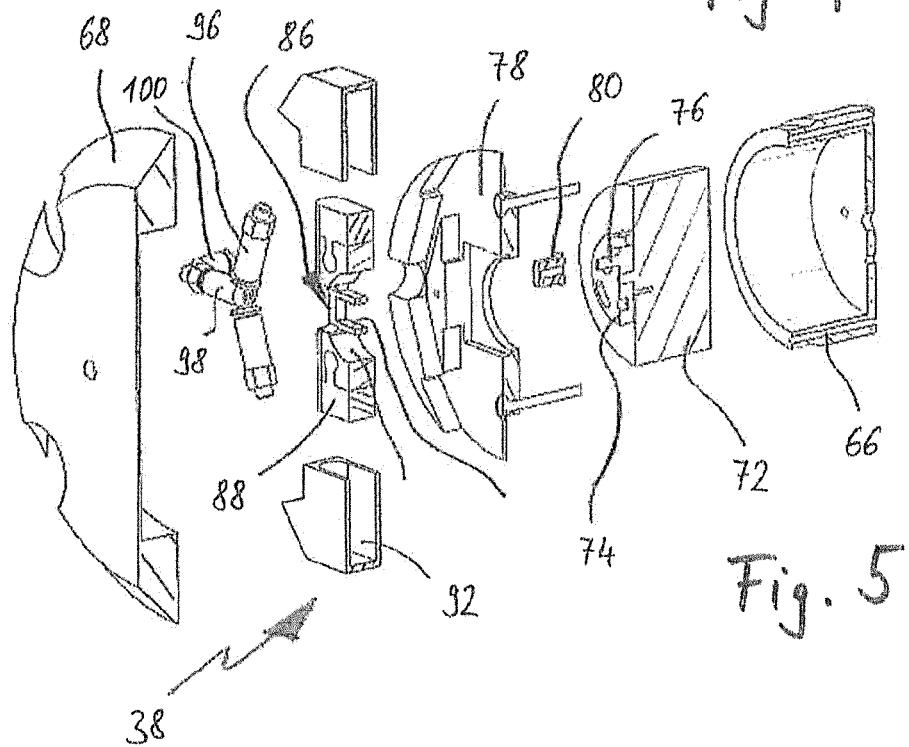
FIG. 5 shows a perspective, exploded, longitudinally sectional depiction of the embodiment according to FIG. 4.

With reference to FIGS. 4 and 5 and also with reference to FIG. 2, the embodiment of the compressor unit 38 will now be described in greater detail.

A double arrow labeled with the reference numeral 102 in FIG. 4 indicates a reciprocating direction of the piston assembly 86 by means of which the working chambers 94-1 and 94-2 are alternatingly compressed and expanded. FIGS. 4 and 5 also show a sample embodiment of the drive element 90. The slider 80 is contained in a sliding guide 104 and is supported so that it is able to move in a transverse direction, which extends perpendicular to the reciprocation direction 102. In this way, a transverse component of the revolving motion of the eccentric coupling 76 is absorbed and canceled so that only the reciprocating component produces the reciprocating motion in the reciprocation direction 102. On the whole, the embodiment of the eccentric coupling coupling drive 82 shown in FIGS. 4 and 5 has the advantages of a simple design and only relatively few bearing points. As explained above, the compressor unit 38 is not necessarily designed for continuous operation. For this reason, it is possible to implement structural simplifications without jeopardizing functional reliability over the expected service life (active service life) of the compressor unit 38.

The piston assembly 86 is embodied as a flat piston and has a non-circular cross-section. For example, the piston sections 88-1 and 88-2 can be made of a plastic material, in particular a plastic material that constitutes a favorable friction pairing with a material of the cylinder caps 92. It is thus possible to minimize the friction and wear in the relative movement between the piston sections 88-1 and 88-2 and the cylinder caps 92-1 and 92-2. For example, the piston sections 88-1 and 88-2 are embodied as separate molded parts and are connected to the drive element 90 by means of joints 106. The drive element 90 is preferably composed of a metal material.

FIG. 4 also shows a sample positioning of the check valves 95 and 96. Thus, for example, the working chamber 94-2 is associated with an intake connection 108-2, which is provided with a corresponding check valve 95-2. In addition, an exhaust connection 110-2 is provided, which feeds into the working chamber 94-2. The exhaust connection 110-2 is associated with a check valve 96-2, which has an orientation opposite from that of the check valve 95-2. The same applies to the working chamber 94-1.

The embodiment of the compressor unit 38 shown in greater detail in FIGS. 4 and 5 has the overall advantage that it can be implemented with a very low installation space requirement. In addition, the number of bearing points and the general number of parts are minimized, while nevertheless also being able to ensure a reliable operation over the expected service life of the compressor unit 38. The compressor unit 38 as a whole features a pronounced compactness and is suitable for integration into existing rim types, thus basically eliminating the need for complex structural modifications.

Alternative designs of the compressor unit 38 shown by way of example in FIGS. 2 through 5 will be described below based on FIGS. 6 through 15.

Figure 6:
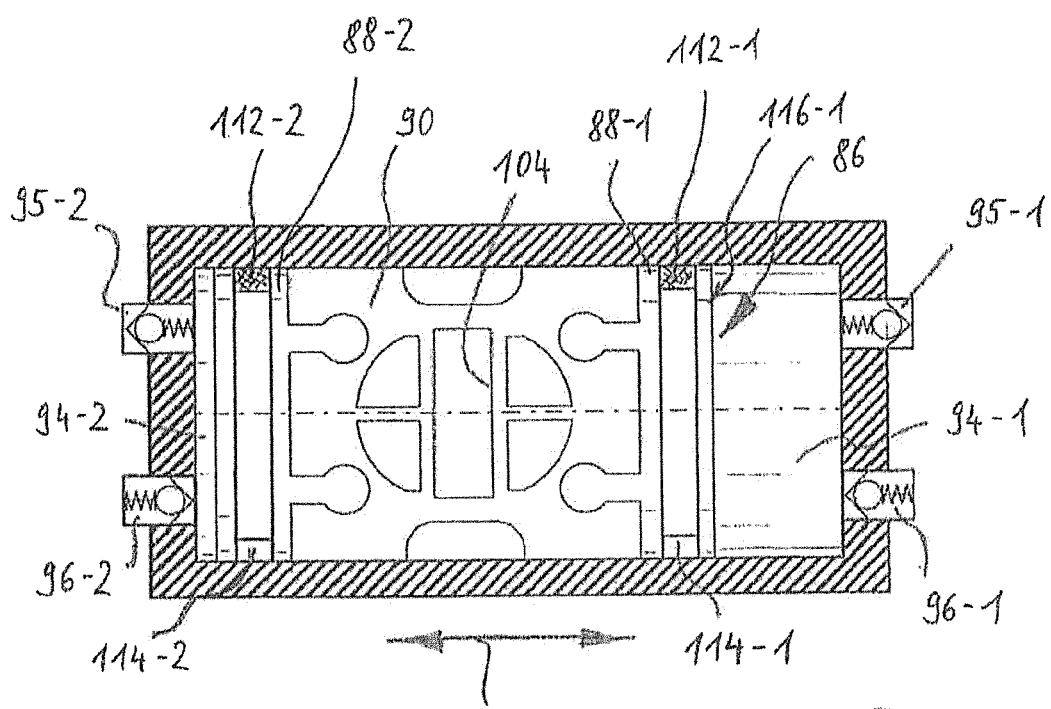
FIG. 6 shows a highly simplified section through a piston assembly, which is associated with a compressor unit.

FIG. 6 shows a longitudinal section through a piston assembly 86 embodied in the form of a double piston, which is similar to the double piston shown in FIGS. 4 and 5. The piston sections 88-1 and 88-2 each have a lubricant depot 112, which is accommodated in a respective groove 114. The groove 114 is adjacent to an end wall 116 of the relevant piston section 88-1 and 88-2. Each respective lubricant depot 112 preferably extends over the circumference of the piston sections 88-1 and 88-2. Each respective lubricant depot 112 can accommodate a lubricant such as oil or grease.

Each respective lubricant depot 112 can be provided with a suitable support material or a suitable support matrix for the lubricant. The support matrix can be of a metallic type or can also be embodied by means of a foam-like or foamed material. In general, the support matrix can be embodied as porous in order to be able to release lubricant in as defined a way as possible over a long period of time. Each respective lubricant depot 112 has no disadvantageous effects—or only insignificant ones—on the guidance behavior of the piston assembly 86. This is particularly due to the fact that the piston assembly 86 is a rigid apparatus.

Check valves 95 and 96 that produce a coupling with the working chambers (or cylinder chambers) 94-1 and 94-2 are also symbolically depicted in FIG. 6. Intake valves are labeled with the reference numeral 95 and exhaust valves are labeled with the reference numeral 96. In alternating fashion, one of the working chambers 94-1 and 94-2 is always in either an intake mode or a compression mode when the piston assembly 86 is being moved back and forth in the reciprocation direction 102. In the example shown in FIG. 6, unlike in the embodiment in FIGS. 2 through 5, the intake valves 95 and the exhaust valves 96 are embedded in the cylinder, thus permitting a more compact design of the compressor unit 38.

Figure 7:
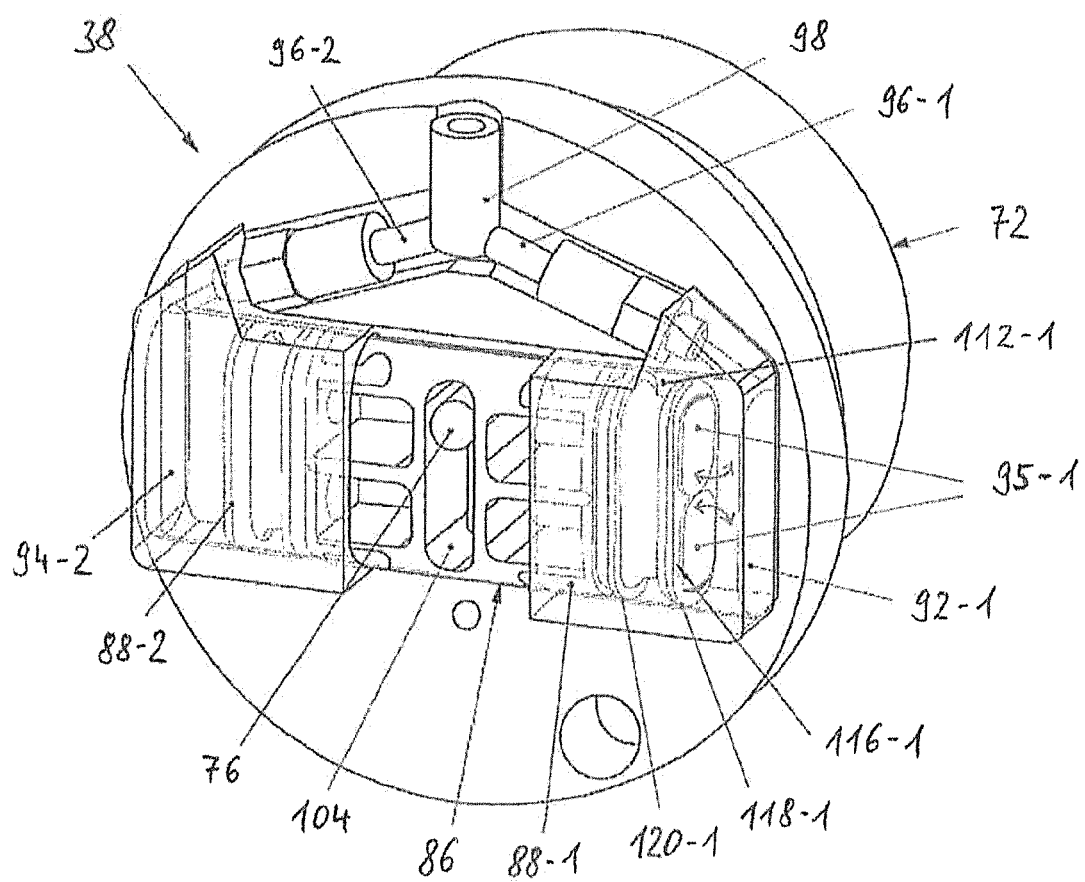
FIG. 7 shows a perspective view of an alternative embodiment of a compressor unit.

FIG. 7 shows another embodiment of the compressor unit 38, which differs from the embodiment in FIGS. 2 through 5 and the example in FIG. 6 with regard to the placement and type of the intake valves. In this case, the intake valves 95 are positioned on the piston assembly 86 itself, specifically in the form of leaf valves embodied on the end walls 116 of the piston sections 88-1 and 88-2. These leaf valves fold open, as indicated by the arrows shown in FIG. 7, during an expansion movement or intake stroke of the relevant piston section 88 and thus allow pressurized medium to flow into the associated working chamber 94. In a subsequent compression movement or compression stroke of the relevant piston section 88 in the opposite direction, the leaf valves fold closed again and prevent a further intake of pressurized medium into associated working chamber 94. As compared to check valves, leaf valves have the advantage that they open more quickly during an intake stroke and as a result, more air can travel into the working chamber 94. It is thus possible to increase the volumetric displacement of the compressor unit 38.

Another difference that the embodiment shown in FIG. 7 has in comparison to the examples shown in FIGS. 2 through 5 and FIG. 6 lies in the fact that the piston assembly 86 embodied as a double piston is composed of one piece. Instead connecting the piston sections 88-1 and 88-2 to each other by means of an interposed drive element 90, the double piston 86 shown in FIG. 7 is composed of one piece, for example made of a metal material. In the region of the end walls 116, sealing lips 118 and 120 are positioned spaced apart from each other, order to ensure a seal relative to the respective cylinder 92. In this case, the lubricant depot 112 is formed between the spaced-apart sealing lips 118 and 120. It is also clear that the use of a slider 80 can be eliminated and the eccentric coupling 76 can basically also travel in the sliding guide 104 without a slider. In order to minimize the friction between the eccentric coupling 76 and the sliding guide 104, the eccentric coupling 76 eccentric coupling be supported on the drive shaft 74 in rotary fashion.

Figure 8A:
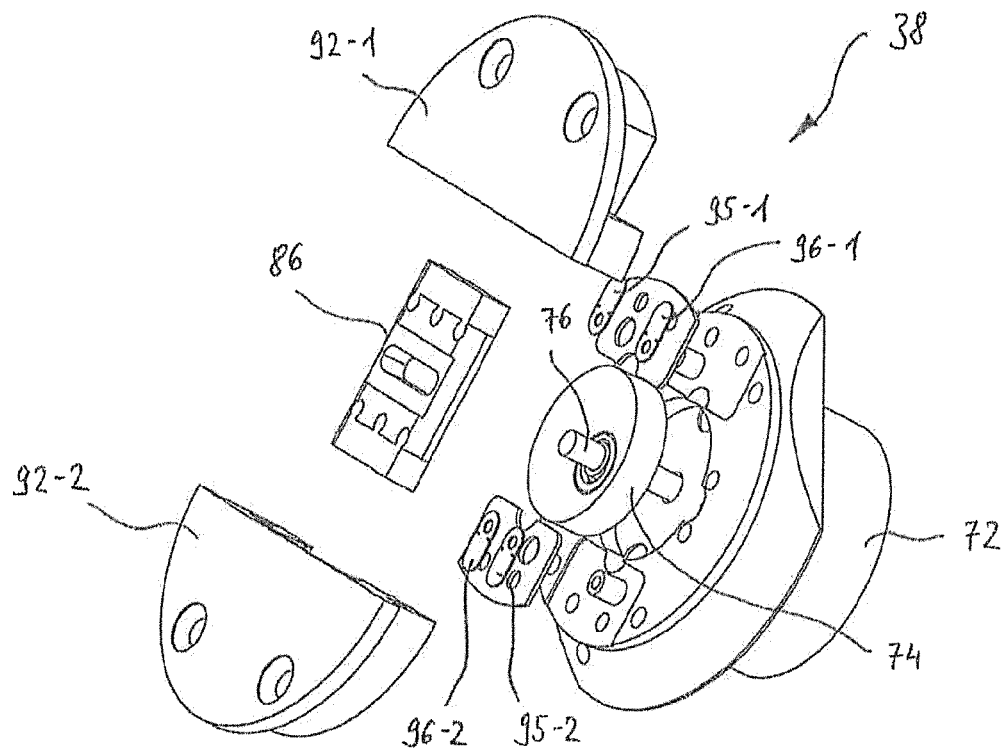
FIG. 8a shows a perspective exploded view of another embodiment of a compressor unit.
Figure 8B:
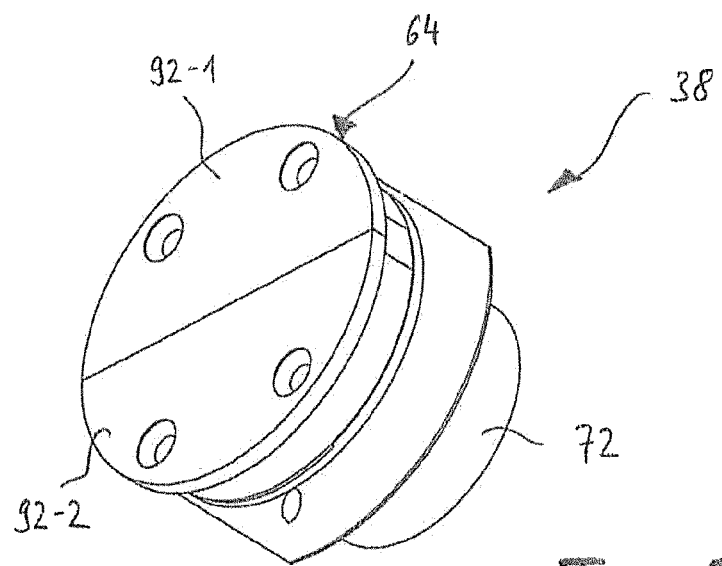

FIGS. 8a and 8b show another exemplary embodiment of the compressor unit 38 in which the installation space requirement is reduced by embodying the cylinders 92 by means of the module housing 64 itself. FIG. 8a shows the exemplary embodiment in an exploded view, while FIG. 8b shows the compressor unit 38 in an assembled state. In order to further reduce the space requirement, the intake valves 95 and exhaust valves 96, similar to the exemplary embodiment in FIG. 6, are embedded in the respective cylinders 92; in this example, however, they are embodied as leaf valves.

Figure 9:
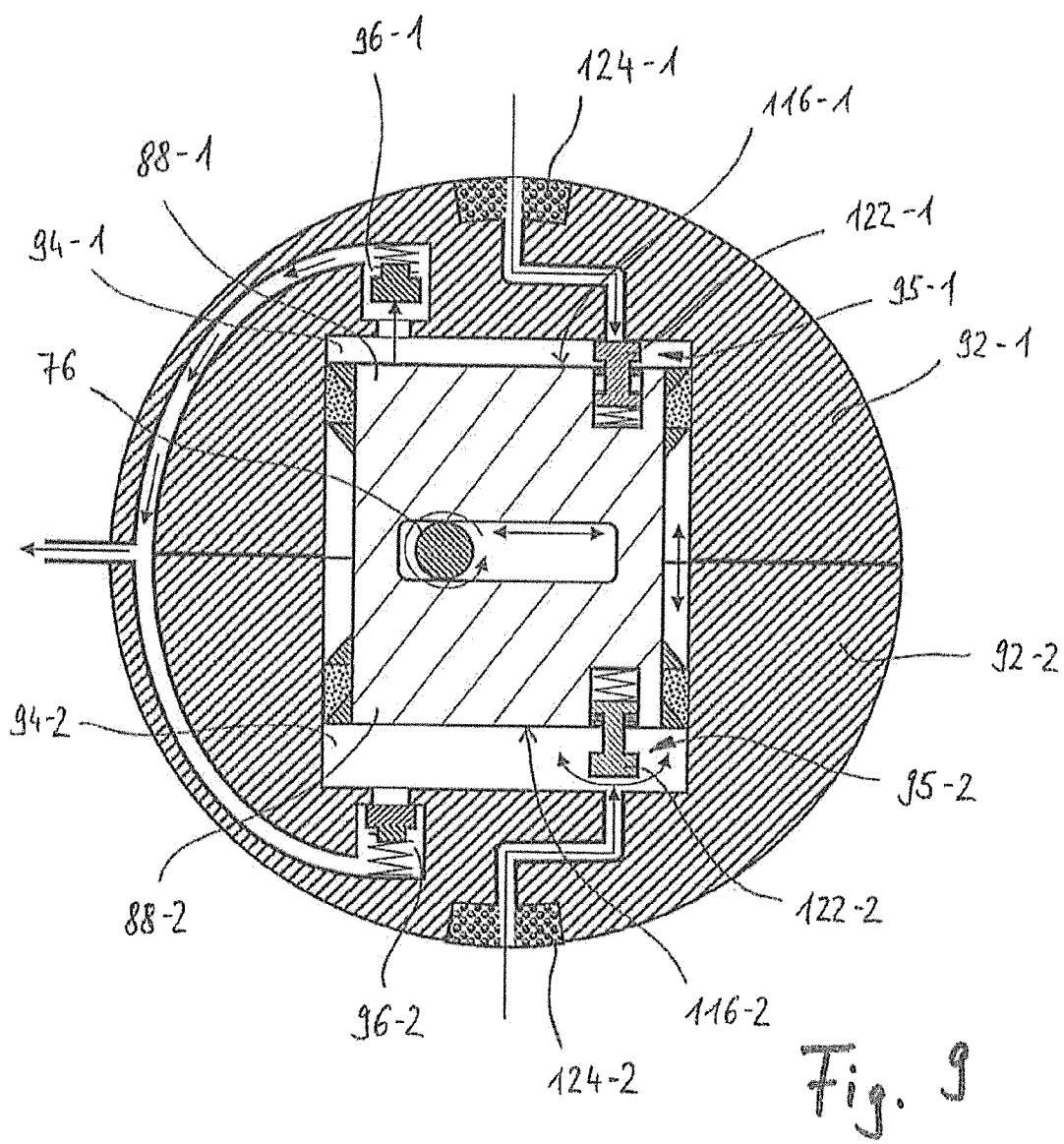
FIG. 9 shows a schematic depiction of a compressor with a piston-controlled intake valve.

FIG. 9 shows a schematic depiction of another embodiment in which the intake valves 95 are embodied in the respective piston section 88 in such a way that during an intake stroke of the relevant piston section 88, the respective intake valve 95 is forced open by its movement. In the example shown, the intake valves 95 are each embodied between the piston sections 88 and the associated cylinders 92. The intake valves 95 include a sealing element 122 that is mounted in a resilient fashion to the end wall 116 of the respective piston section 88 (e.g. by means of a compression spring), which sealing element is pressed against a pressurized medium inlet opening positioned in the associated cylinder 92 and closes this opening until it is moved away from the pressurized medium inlet opening during an intake stroke. In this example, the opening of the intake valves 95 is therefore produced by the movement of the piston itself in that the respective sealing element 122 is briefly pulled away from the pressurized medium inlet opening by the relevant piston section 88 and uncovers it. Since the opening and closing of the intake valves 95 is controlled by the movement of the piston, this arrangement can also be referred to as "piston-controlled intake valves." The opening of an intake valve 95 in this case is independent of a vacuum produced in the associated working chamber 94 by the intake stroke. In comparison to conventional check valves, the intake valve can therefore be opened more quickly and it is thus possible to achieve an improved intake volume with a higher delivery capacity overall. FIG. 9 also shows that the pressurized medium inlets can be provided with filters 124 for filtering the aspirated pressurized medium.

Figure 10A:
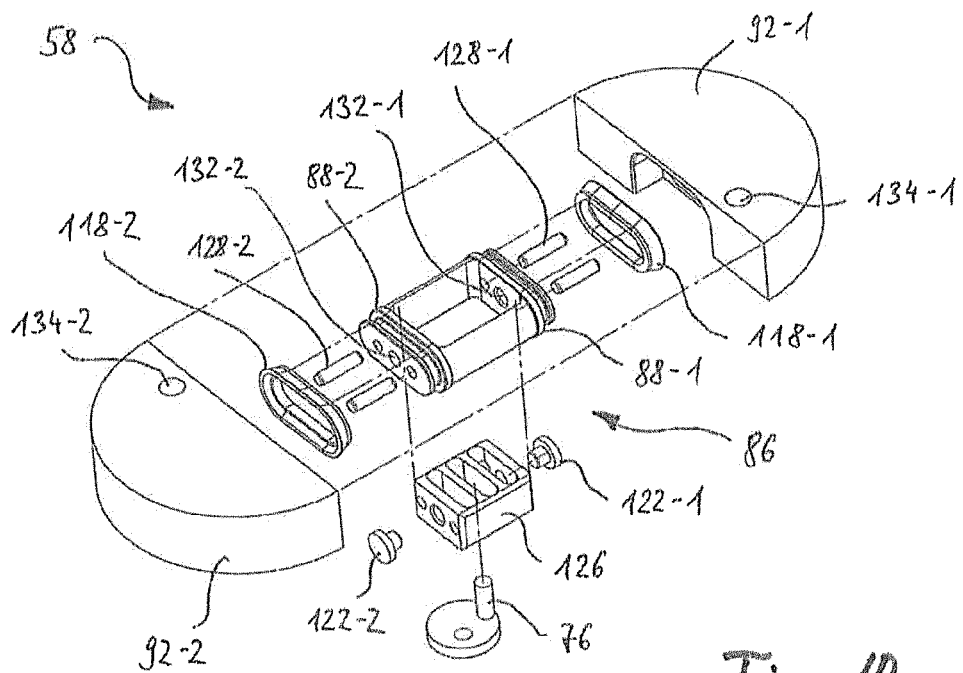
FIG. 10a shows a perspective exploded view of an alternative compressor with a piston-controlled intake valve.
Figure 10B:
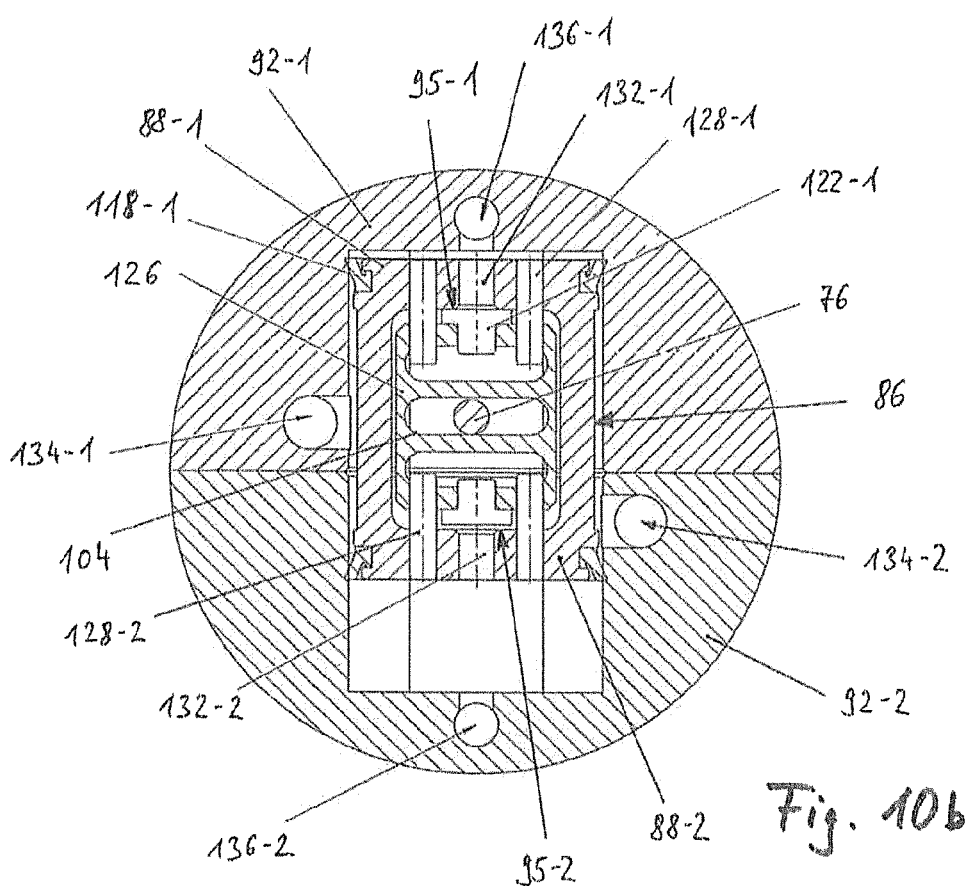

FIGS. 10a and 10b show another embodiment with piston-controlled intake valves 95, in which the forced opening of the intake valves 95 can be produced in an even more reliable fashion since, by contrast with the preceding example, it is possible to eliminate spring elements. In this example, the intake valves 95 are embodied on the double piston 86 itself. For this purpose, the double piston 86 includes a drive bushing 126, which is positioned between the opposing piston sections 88-1 and 88-2 and is guided so that it can travel freely along guide pins 128, which extend inward from the piston sections 88-1 and 88-2, parallel to a longitudinal axis of the double piston 86. The drive bushing 126 is framed by the piston sections 88-1 and 88-2 and by the side walls of the double piston 86 that connect the piston sections 88-1 and 88-2 to each other. The sliding guide 104 for accommodating the eccentric coupling 76 in this case is positioned in the drive bushing 126. The piston sections 88-1 and 88-2 are in turn provided with sealing lips 118, which seal the piston sections 88-1 and 88-2 relative to the cylinders 92.

On the end surfaces of the drive bushing 126 oriented toward the piston sections 88-1 and 88-2, sealing elements 122 are mounted, which can open or close corresponding pressurized medium inlet openings or bores 132 provided in the piston sections 88-1 and 88-2. Since the drive bushing 126 is guided so that it can travel freely along the guide pins 128 and has a certain amount of play in the free travel direction relative to the piston sections 88-1 and 88-2, during an intake stroke of a respective piston section 88, the drive bushing 126 lifts the relevant sealing element 122 up from the associated pressurized medium inlet opening or bore 132 and thus opens the relevant intake valve 95. As soon as the eccentric coupling 76 begins to move the drive bushing 126 in the opposite direction for the subsequent compression stroke, the drive bushing 126 pushes the relevant sealing element 122 back against the associated pressurized medium inlet opening or bore 132 and closes the relevant intake valve 95 for the upcoming compression stroke. As soon as the drive bushing 146 then once again starts to move in the opposite direction, the relevant intake valve 95 immediately opens for the upcoming intake stroke. This illustrates a decisive advantage: the opening and closing of the intake valves 95 takes place immediately at the change in direction of the movement of the double piston 86 so that the possible intake volume or compression volume is used in a virtually optimum fashion. It is thus possible to significantly improve the delivery capacity of the compressor unit 38. In FIGS. 10*a* and 10*b*, the pressurized medium intake bores in the cylinders are labeled with the reference numeral 134 and the pressurized medium bores in the cylinders are labeled with the reference numeral 136.

Figure 11:
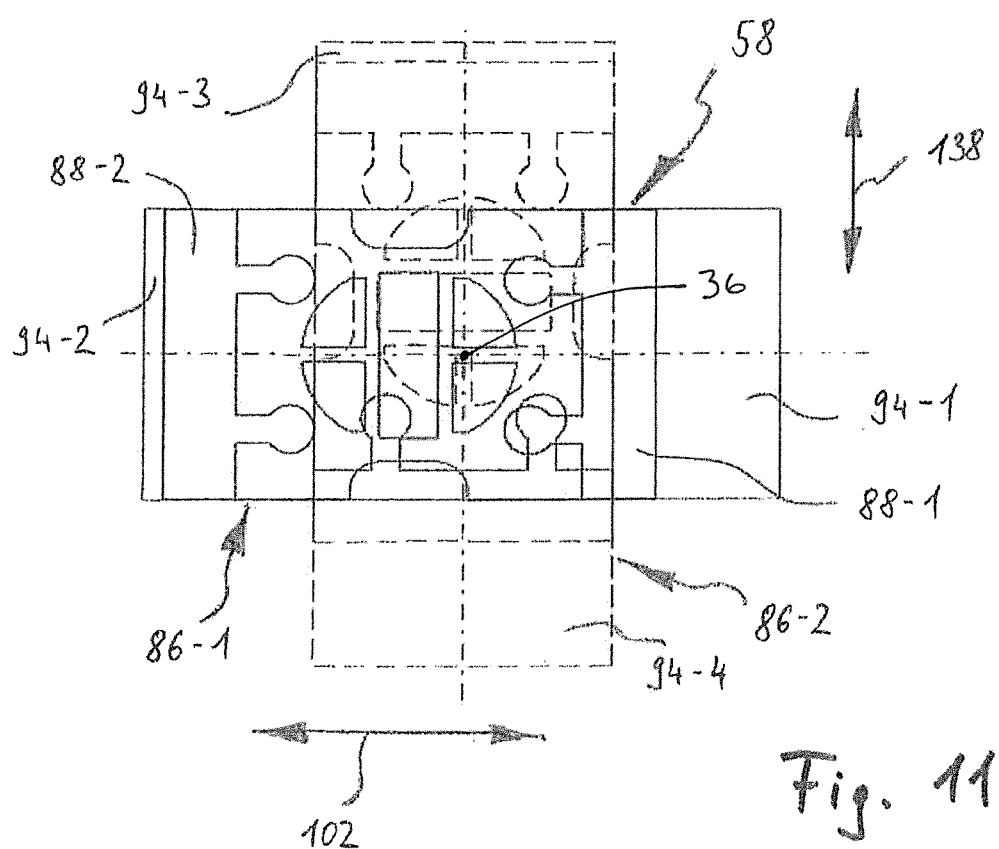
FIG. 11 shows a schematic depiction of a modified piston assembly.
Figure 12:
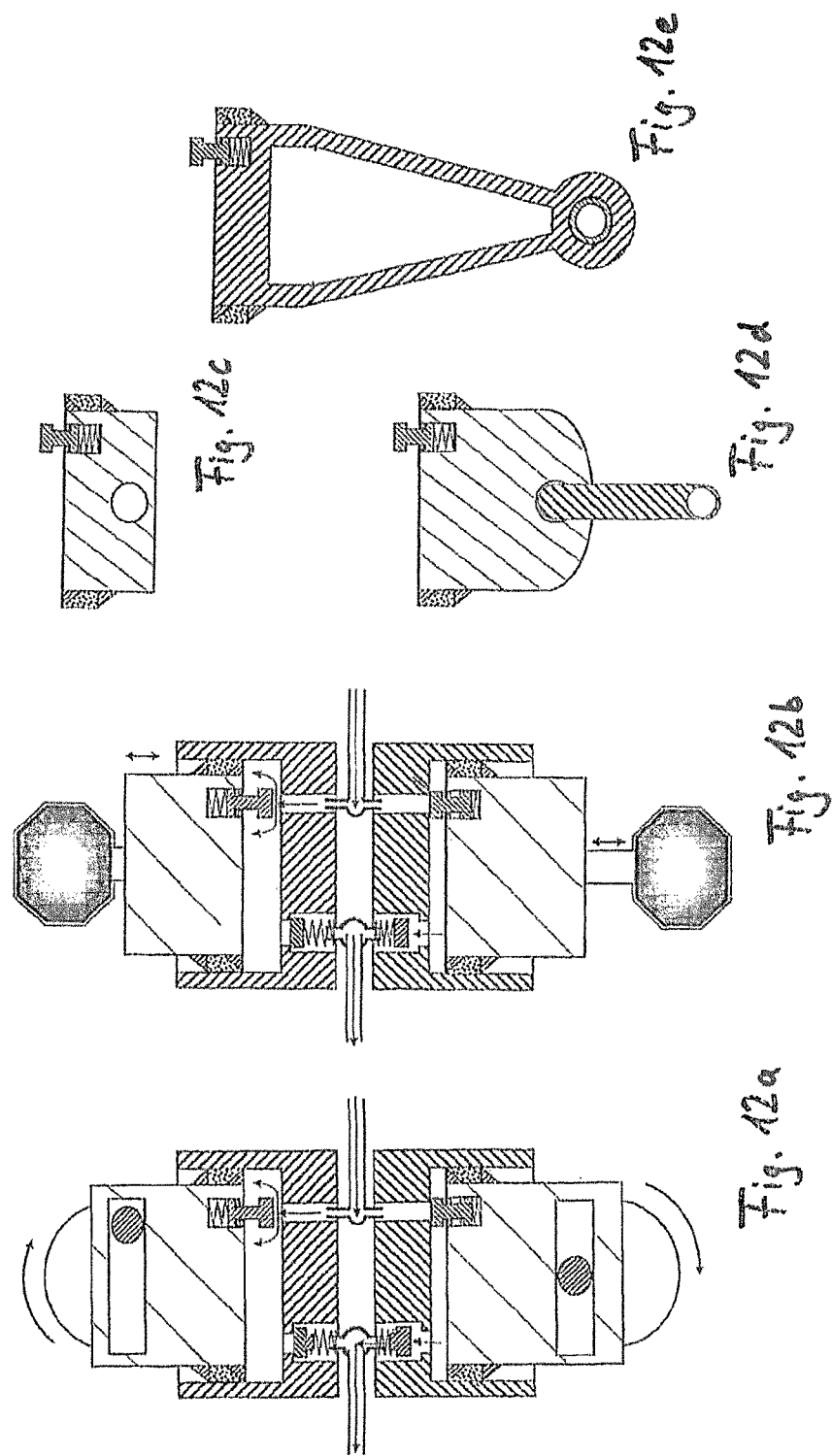
FIG. 12a shows a schematic depiction of another compressor and piston variant.
FIG. 12b shows a schematic depiction of another compressor and piston variant.
FIG. 12c shows a schematic depiction of another compressor and piston variant.
FIG. 12d shows a schematic depiction of another compressor and piston variant.
FIG. 12e shows a schematic depiction of another compressor and piston variant.

In a schematic, highly simplified depiction, FIG. 11 shows an alternative embodiment of a compressor 58, which has a plurality of piston assemblies 86. The compressor 58 in this case includes two piston pairs 86-1 and 86-2 that are axially offset from each other, which are associated with corresponding working chambers 94-1 and 94-2 as well as 94-3 and 94-4. Preferably, the piston assemblies 86-1 and 86-2 are rotated by 90° relative to each other, see the reciprocation direction 102 of the first piston assembly 86-1 and the reciprocation direction 138 of the piston assembly 86-2, which is oriented perpendicular thereto.

The drive unit of the compressor 58 can be embodied in a simple way by the fact that the drive shaft 74 of the motor 72 has a plurality of eccentric coupling sections 76 that are angularly offset from one another. In this way, as the drive shaft 74 (not shown in FIG. 11) revolves, a first direction component 102 and a second direction component 138 of the revolution of the eccentric coupling sections 76 are used to drive the two piston pairs 86-1 and 86-2. While requiring a minimally increased amount of axial installation space on the whole (with an unchanged outer diameter), this makes it possible to achieve a significant increase in the delivery capacity or compression power of the compressor 58. It is thus possible to produce high volumetric flows and/or high pressures. In addition, the eccentric coupling sections 76 of the drive shaft 74 are embodied so that on the whole, a very smooth pressure curve is produced in a shared outflow from the compressor 58.

FIGS. 12*a* through 12*e* show other variants of reciprocating piston compressors, which are merely indicated for illustrative purposes and are intended to show that the invention should not be limited to the double piston variants described above in conjunction with FIGS. 2 through 11. Thus FIG. 12*a* shows a sample variant in which instead of a double piston, two simple reciprocating pistons are used, each with a separate eccentric coupling drive. FIG. 12*b* shows a similar variant, which instead of a respective eccentric coupling drive, works with drive units that produce a linear motion. FIGS. 12*c* through 12*e* also show sample reciprocating pistons that are used in compressors with only a single working chamber. The piston shown in FIG. 12*e* is embodied for a connecting rod arrangement.

Figure 13:
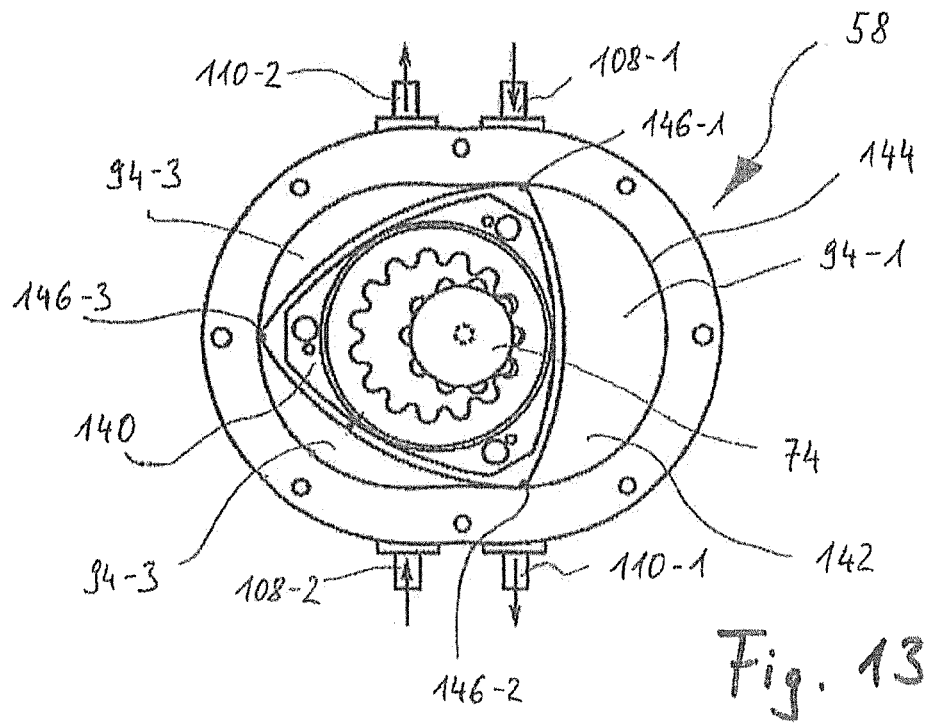
FIG. 13 shows a highly simplified top view of a compressor of a compressor unit with a rotary piston apparatus.

With reference to FIG. 13, a fundamentally different embodiment of the compressor 58 of the compressor unit 38 will now be described. In this embodiment, the compressor 58 is embodied in the form of a rotary piston compressor whose rotary piston 140 is embodied as a Wankel piston, which can be moved in rotary fashion in a compression chamber 142 in accordance with the Wankel principle or Wankel motor principle. The rotary piston 140 is associated with working chambers 94, which are defined between the rotary piston 140 and a (epitrochoidally shaped) circumference wall 144 of the compression chamber 142. In this way, a plurality of working chambers 94 can be formed with a single rotary piston 140.

In the example shown, the drive shaft 74 and the rotary piston 140 are coupled to each other by means of a gearing. By means of the gearing, an eccentric offset (momentary offset) can be produced between the drive shaft 74 and the rotary piston 140. The rotary piston 140 rotates around the drive shaft 74 on an eccentric path. Intake connections 108 and exhaust connections 110 are positioned so that when the rotary piston 140, in the course of its rotary motion, is sliding with its sealing lips 146 along the circumference wall 144 of the compression chamber 142, pressurized medium, which has traveled into a working chamber 94 through an intake connection 108, is compressed as the rotary motion continues and is pushed out of the working chamber 94 through an exhaust connection 110 located after the intake in the rotation direction.

In a fashion similar to the one in the above-described variants of a reciprocating piston compressor, the exhaust connections 110 can be followed by valves such as check valves or leaf valves in order to prevent a reflux of the pressurized medium into the compression chamber 142. At the intake connections 108, such a valves are not necessary since in the rotary piston compressor, unlike in reciprocating piston compressors, intake connections 108 and the exhaust connections 110 are always associated with different working chambers 94 at any given instant and consequently, an intake connection 108 does not have to be closed while the pressurized medium is being displaced out through an exhaust connection 110. An intake connection 108 can therefore be embodied in the form of a simple opening.

Figure 14:
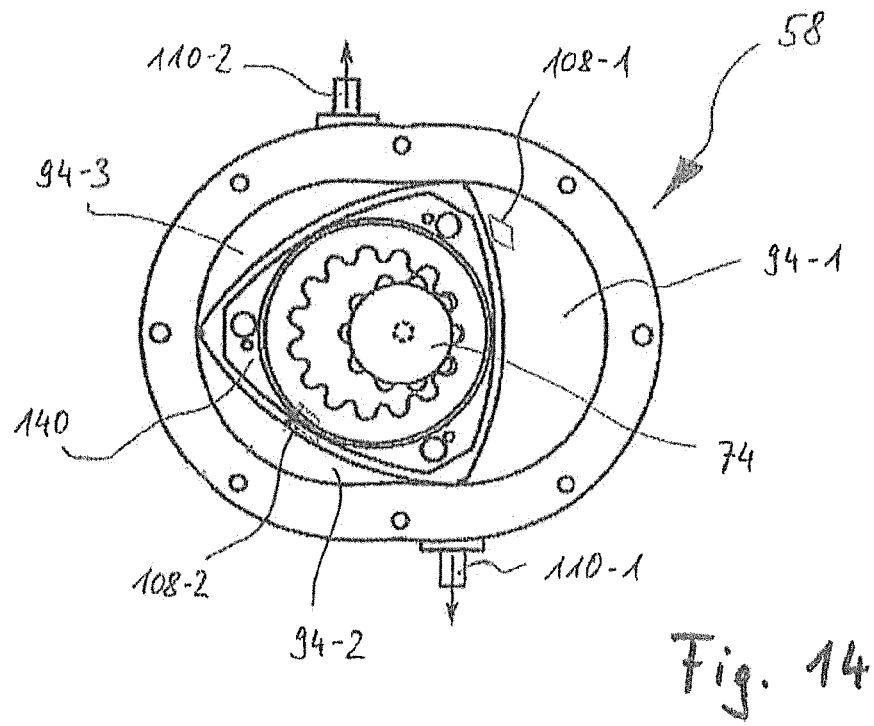
FIG. 14 shows a highly simplified top view of a slightly modified compressor with a rotary piston apparatus.

In the exemplary embodiment in FIG. 13, the intake connections 108 and exhaust connections 110 are positioned in the circumference wall 144 of the compression chamber 142. FIG. 14 shows an alternative embodiment option with regard to the intake connections 108. In this case, viewed in the depth direction of the drawing, the intake connections 108 are embodied in the upper or lower side wall of the compression chamber 142, i.e. in one of the side walls of the compression chamber 142, that cover the circumference wall 144 at the top and bottom. In this example, the intake connections 108 are alternatingly covered (and thus closed) or opened by the rotary piston 140 in the course of its rotary motion. In the situation shown in FIG. 14, the intake connection 108-1 is open while the intake connection 108-2 is closed by the rotary piston 140. In comparison to an intake connection 108 in the circumference wall 144, this variant prevents the sealing lips 146 of the rotary piston 140, which slide along the circumference wall 144 during the rotary motion, from (minimally) bumping into the openings of the intake connections 108 and becoming worn or damaged over time.

Figure 15:
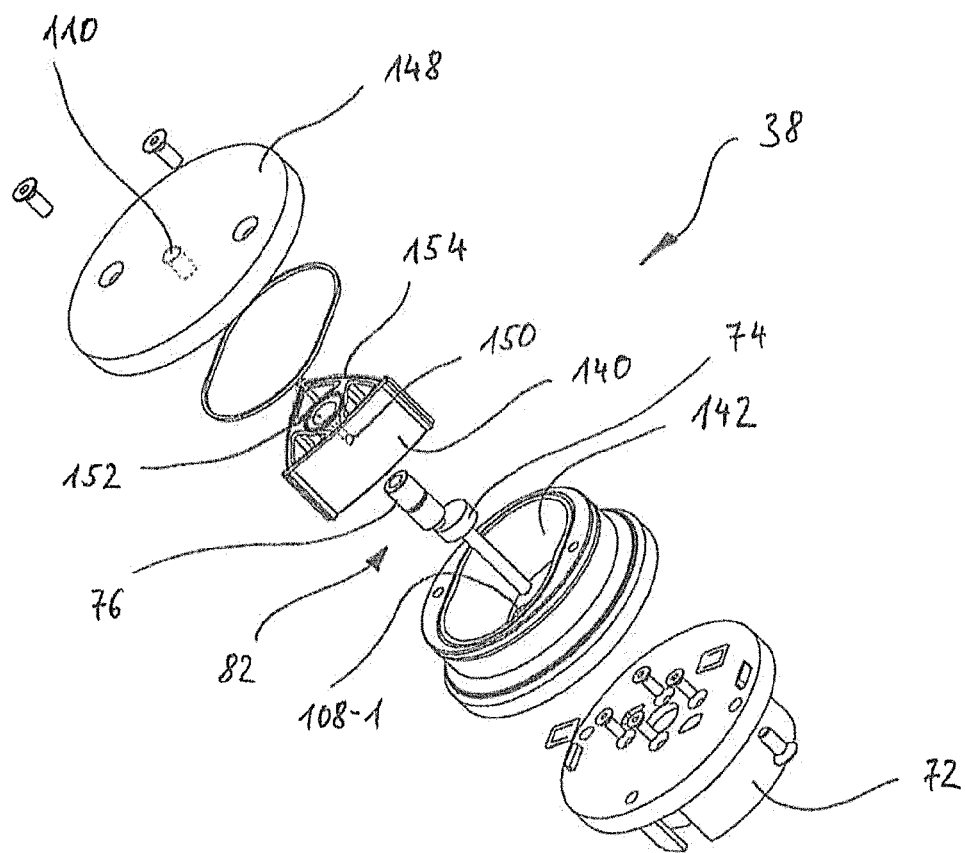
FIG. 15 shows a perspective exploded view of an alternative compressor unit with a rotary piston apparatus.

Another exemplary embodiment of a rotary piston compressor is shown in an exploded view in FIG. 15. This exemplary embodiment differs from the example in FIG. 14 first of all due to the fact that the drive shaft 74 and the rotary piston 140 are not coupled to each other by means of a gearing, but rather, analogous to the above-described reciprocating piston compressors, by means of an eccentric coupling drive 82, in which a cam 76 is accommodated in a central opening of the rotary piston 140 so as to be coupled to the rotary piston 140. This embodiment makes it possible to achieve a rotary motion of the rotary piston 140 analogous to that of the exemplary embodiment in FIG. 14. It is then possible to eliminate the directionally sensitive and expensive-to-produce gearing.

Other hand, the example in FIG. 15 differs from the one in FIG. 14 in that the exhaust connections 110 are not positioned on the circumference wall 144 of the compression chamber 142. Instead, pressurized medium is conveyed out of the compression chamber 142 through the rotary piston 140, and to an exhaust connection 110 embodied in the cover 148. For this purpose, exhaust openings 150 are provided on the side of the rotary piston 140 oriented toward the circumference wall 144, from which the pressurized medium inside the rotary piston 140 is conveyed to a central region 152 of the rotary piston 140 in order to be conveyed from there, out through the exhaust connection 110 provided in the cover. The lateral sealing lips 154 of the rotary piston 140, which seal the rotary piston 140 relative to the side wall of the compression chamber 142 formed by the cover 148, ensure that pressurized medium that is present in the central region 152 of the rotary piston 140, flows into the exhaust connection 110. In order to ensure that pressurized medium does not flow from one exhaust opening 150, via another exhaust opening 150 embodied on the rotary piston 140, and back into another working chamber 94 of the compression chamber 142, corresponding valves such as leaf valves can be provided at the exhaust openings 150 on the interior of the rotary piston 140. In comparison to an exhaust connection 110 embodied in the circumference wall 144, this variant prevents the sealing lips 146 of the rotary piston 140, which slide along the circumference wall 144 during the rotary motion, from (minimally) bumping into the openings of the exhaust connections 110 and becoming worn or damaged over time.

A compressor 58 provided with a rotary piston 140 can be compactly designed, primarily with regard to the depth of the installation space, and can be produced with a small number of parts. In the exemplary embodiments shown, the mass of the compressor 58 is essentially centrally concentrated so that the device has an advantageous mass moment of inertia. On the whole, this can result in a smooth running of a compressor unit 38 that is equipped with the compressor 58. Particularly in a rotating vehicle wheel 16, the operation of the compressor 58 is not influenced, or not significantly influenced, by the overall rotation of the wheel.

It is understood that the exemplary embodiments in FIGS. 13 through 15 can be supplemented with additional rotary pistons 140, which are axially offset from one another and define additional working chambers 94. It is also understood that instead of a compressor 58 functioning in accordance with the Wankel principle, basically other embodiments of compressors with rotary pistons can be produced, for example vane pumps, gear pumps, or the like.

In the following, reference is once again made to FIG. 3, in order to describe additional properties of the pressurized medium supply device 22 mounted on the vehicle wheel rim 34. For definition purposes, the outside of the vehicle wheel 16 is labeled with the reference numeral 154 and the inside of the vehicle wheel 16 is labeled with the reference numeral 156. On the inside 156, the wheel 16 is mounted on the wheel carrier 60. The outside 154 is the side that faces outward when the wheel 16 is in the mounted state.

FIG. 3 schematically depicts the compressor unit 38 in an installed and connected situation. As explained above, the vehicle wheel rim 34 is mounted to a wheel hub 62 (merely indicated in FIG. 3), which is supported on the wheel carrier 60. The wheel hub 62 is rigidly connected to a brake 158, in particular a brake disc of the brake 158. On the whole, therefore, the wheel 16, the compressor unit 38, and brake disc are mounted in rotary fashion on the wheel carrier 60.

The pressurized medium supply device 22 includes a control module 160, which is embodied to process signals and to trigger the compressor unit 38 so that it inflates the tire 54. The control module 160 can also be embodied to communicate with the (overriding) control unit 24 (see FIG. 1). Alternatively, the control module 160 can be embodied to independently control the pressurized medium supply device 22, at least in an emergency operating mode.

The connection of the compressor unit 38 to the tire 54 is produced by means of at least one pressurized medium path 162, which is embodied on or accommodated in the rim 36. Preferably, the pressurized medium path 162 is associated with a spoke 48 of the rim 34. According to another embodiment, the pressurized medium path 162 is integrated into the spoke 48, preferably in the form of a through hole or through bore between the central region 42 and the rim well 50 or one of the rim bead seats 52.

In the example shown in FIG. 3, the pressurized medium path 162 feeds into an intermediate space between the well 50 and the tire 54 in the vicinity of the rim well 50. At the mouth of the pressurized medium path 162, an inflation valve 166 is provided, by means of which the tire 54 can be inflated and which is embodied for example as a check valve. Preferably, the pressurized medium path 162 is positioned so that it is concealed and invisible from the outside and the inflation valve 166 cannot be contacted from the outside. Since the tire 54 is inflated by the pressurized medium supply device 22, it is basically not necessary to have an exposed valve for the tire 54. On the one hand, this has advantages with regard to design and on the other, advantages with regard to a reduced tendency of the rim 34 to become soiled in the vicinity of the valve. For emergencies, a refill valve 168 can be provided, which can be embodied, for example, as a bypass valve. Two conceivable embodiments of such refill valves 168-1 and 168-2 are shown in FIG. 3. The refill valve 168-1 is positioned in a rear region of the rim 34, in particular on a spoke 48 of the rim 34, and is oriented toward the inside 156. The refill valve 168-1 is not visible from the outside 154. The tire 54 can also be filled by means of the refill valve 168-1 using external pressure producing devices, for example at gas stations, at repair shops, or during assembly of the vehicle 10 or wheel 16, where it is possible to contact the rear-oriented refill valve 168-1. It is understood that the refill valve 168-1 can also be embodied as an angled valve in order to facilitate the contact from the outside 154.

According to an alternative embodiment, a refill valve 168-2 can be installed, which is positioned in spatial proximity to the compressor unit 38, particularly in the central region 42 of the rim 34. This placement of the refill valve 168-2 takes advantage of the fact that the pressurized medium path 162 is provided between the compressor unit 38 and the tire 54 anyway and the refill valve 168-2 can be coupled to the pressurized medium path 162 in the central region 42 of the rim 34. It is understood that the refill valves 168-1 and 168-2 can be embodied as check valves in order to be inactive during normal operation (when the inflation and regulation of the pressure is performed by the pressurized medium supply device 22).

FIG. 3 also shows an energy supply connection 170 for service purposes or for emergencies, which is connected to the control module 160 via a line 172. By means of the connection 170, the pressurized medium supply device 22 can be supplied with energy if an energy supply via the wheel carrier 60 is not possible. This can be the case, for example, if the wheel 16 is not mounted on the wheel carrier 60. The control module 160 can be embodied to detect such a state and to independently initiate an inflation of the wheel 54 if the connection 170 is connected to an external energy source. The connection 170 and, if provided, the refill valve 168-2, are preferably in a covered or concealed position and can, for example, be revealed by means of service flaps or service caps.

Figure 16:
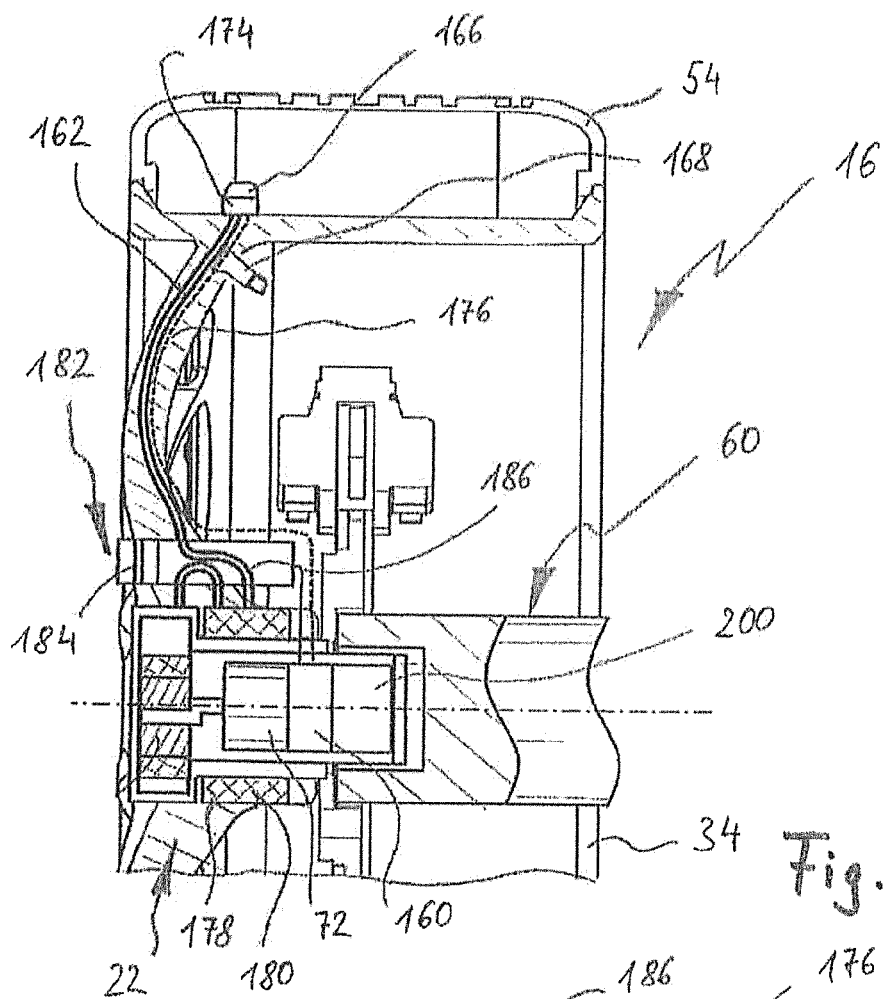
FIG. 16 shows a partial depiction of an embodiment of a vehicle wheel that is slightly modified relative to the one shown in FIG. 3, with a pressurized medium supply device in a first operating state.

Other possible embodiments of the pressurized medium supply device 22 shown in FIG. 3 will now be described with reference to FIGS. 16 and 17. The pressurized medium supply device 22 shown in FIG. 16 is embodied to receive signals, which are detected by a pressure sensor 174 located inside the tire. For this purpose, a sensor line or signal line 176 is provided, which is routed between the pressure sensor 174 and the control module 160. Preferably, the sensor line 176 extends parallel to the pressure medium path 162 in at least some sections. It is also conceivable for at least some sections of the sensor line 176 to be (structurally) integrated into the pressurized medium path 162. Based on the signals transmitted by the pressure sensor 174 it is possible to determine, for example, whether a flat tire has occurred. Such a state is characterized, for example, by a particular pressure drop per unit time. It is understood that the pressure sensor 174 and the control module 160, as an alternative to the sensor line 176, can also communicate with each other wirelessly. The pressure sensor 174 can then be provided with a separate, independent energy supply (e.g. by using energy harvesting) and can be embodied to wirelessly transmit signals about the current pressure state in the tire 54.

Figure 17:
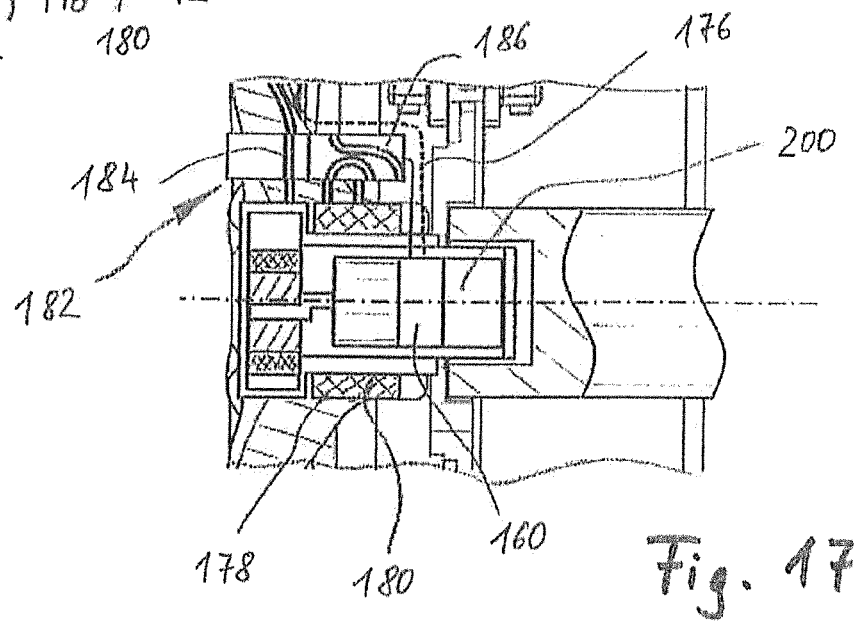
FIG. 17 shows a partial view of the depiction according to FIG. 16 in a second operating state.

The embodiment of the pressurized medium supply device 22 shown in FIGS. 16 and 17 also has a sealant reservoir 178, which contains a tire sealant 180. Preferably, the sealant reservoir 178 is embodied in the form of a sealant reservoir that extends in annular fashion in at least some sections and can surround the module housing 64 and/or the cup 66 of the compressor unit 38 in annular or annular-segment fashion. It can also be advantageous to embody the sealant reservoir 178 in modular fashion as an interchangeable part so that it can be replaced when the tire sealant 180 runs out. It is thus possible to replenish the pressurized medium supply device 22 for the next flat tire. The control module 160 can also be embodied for selectively coupling with the sealant reservoir 178, for example in order to convey the tire sealant 180 into the interior of the tire 54 in a definite way, for example in the event of a sudden loss of pressure detected by the pressure sensor 174.

The pressure sensor 174 can alternatively also be embodied as a combined pressure/temperature sensor. It is thus possible for the pressure sensor 174 to also detect temperature fluctuations and to possibly correct detected pressure values while taking into account temperature fluctuations.

In order to control a sealing process, the pressurized medium supply device 22 has an on/off valve 182 in the form of a multi-port valve, which can be switched between an open position 184 and a bypass position 186. In the open position 184 (see the state shown in FIG. 17), the compressor unit 38 is connected to the tire 54 directly via the pressurized medium path 162. In this switched position, the tire 54 can be filled with the pressurized medium. In the bypass position 186 (see the state shown in FIG. 16), the compressor unit 38 is connected via the sealant reservoir 178 to the pressurized medium path 162 and the interior of the tire 54. In this switched position of the valve 182, the tire sealant 180 can be definitely placed under pressure and conveyed via the pressurized medium path 162 into the tire 54 in order to seal leaks. The control module 160 can carry out the triggering of the on/off valve 182.

There are conceivable embodiments in which in addition to the pressurized medium path 162, a separate supply path is provided for the tire sealant 180. There are also conceivable embodiments in which the sealant reservoir 178 is provided in a different location on the vehicle wheel rim 34. It is thus possible for the sealant reservoir 178 to be embodied, for example, in the form of a cavity in a spoke 48 of the vehicle wheel rim 34 or for it to be accommodated in an installation space that may still be available adjacent to the compressor unit 38 in the vicinity of the center bore 44 of the vehicle wheel rim 34.

In the following, several exemplary embodiments will be used to explain how to embody a device for providing a vehicle wheel-mounted energy supply, for example to supply energy to the pressurized medium supply device 22. In order to do so, reference will first be made once again to FIG. 3.

In order to supply electrical components such as the electric motor-driven compressor unit 38, the control module 160, or the pressure sensor 174 with the necessary operating energy, it is possible to transmit electrical energy to the vehicle wheel 16 that is supported in rotary fashion on the wheel carrier 60. For this purpose, an energy collecting element can be positioned on the vehicle wheel 16, which cooperates with a vehicle-mounted part in order to feed electrical energy into the energy collecting element. The feeding in this case can take place in an inductive or capacitive fashion, by generator, or through mechanical contact.

With the inductive or capacitive energy transmission and with energy transmission through mechanical contact, the wheel-mounted component can be supplied with energy from a vehicle-mounted energy source both while the vehicle is being driven and also while it is at rest. FIG. 3 shows highly schematic energy collecting elements 188 mounted on the vehicle wheel 16 and corresponding energy transmission elements 190 mounted on the wheel carrier 60, between which the desired energy transmission can take place. The energy transmission elements 190 are joined by lines 192 that can essentially correspond to the lines 30-1 through 30-4 shown in FIG. 1. The vehicle-mounted energy source can be the energy storage device 28 shown in FIG. 1.

When energy is supplied by generator, the energy can only be supplied while the vehicle is being driven, but not when it is at rest because the energy to be fed in via the energy collecting element can only be produced during a relative motion between the wheel 16 and the wheel carrier 60. When energy is supplied by generator, the lines 192 can be omitted since it is not necessary to transmit energy from a vehicle-mounted energy source.

Figure 18:
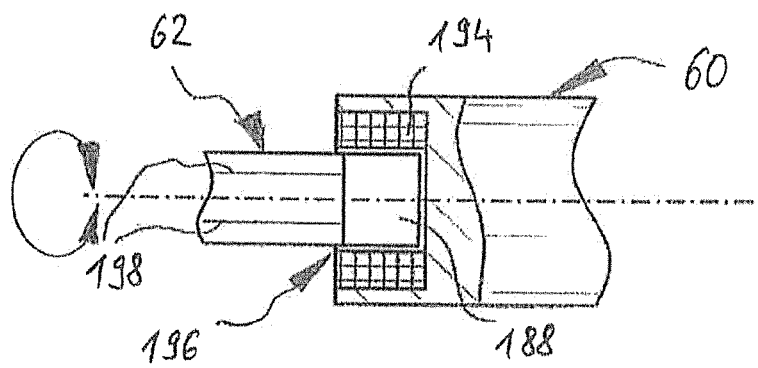
FIG. 18 shows a partial depiction of a longitudinal section through a wheel hub section, which cooperates with a wheel carrier for energy transmission.
Figure 19:
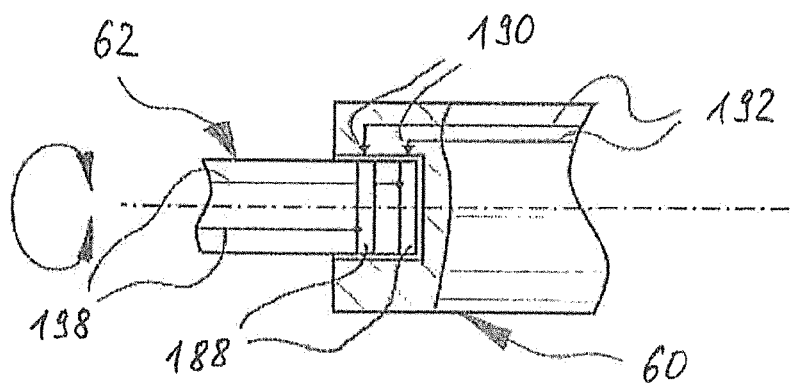
FIG. 19 shows a partial depiction of a longitudinal section through an alternative embodiment of a wheel hub section, which cooperates with a wheel carrier to perform the energy transmission.

Detailed schematic views of possible embodiments of the vehicle wheel-mounted energy supply device are shown in FIGS. 18 and 19. FIG. 1.8 shows one example of an energy supply by generator. In this example, the energy collecting element 188 includes a rotor, which cooperates with a stator 194 mounted on the wheel carrier 60 and together with it, constitutes a generator device 196, which produces electrical energy when the vehicle wheel 16 rotates around the wheel carrier 60. This energy is fed into the energy collecting element 188 and is conveyed via a supply line 198 to the wheel-mounted component that is to be supplied with energy. In the example shown, the wheel hub 62 is mounted to the wheel carrier 60 in such a way that it extends a certain distance into the wheel carrier 60 so that the wheel hub 62 is encompassed by the wheel carrier 60 for a short axial section relative to the longitudinal axis of the wheel carrier 60. The energy collecting element 188, which includes the rotor, and the stator 194 are positioned in the axial section so that the stator 194 encompasses the rotor in annular fashion. When a relative rotation between the wheel 16 and the wheel carrier 60 occurs, then a relative rotation between the stator 194 and the rotor occurs, which induces a voltage in the rotor that can be supplied via the supply line 198 to the wheel-mounted component that is to be supplied.

FIG. 19 shows a design similar to the one in FIG. 18. By contrast with the embodiment in FIG. 18, the energy transmission according to FIG. 19 takes place in an inductive or capacitive fashion or through mechanical contact. In the case of inductive energy transmission, the energy collecting element 188 includes a receiving element suitable for inductive coupling and the corresponding energy transmission element 190 has a transmitting element suitable for inductive coupling, which is powered via the lines 192, for example by the vehicle-mounted energy storage device 28. The receiving element and the transmitting element are positioned on opposing circumference surfaces of the wheel carrier 60 and the wheel hub 62; the receiving element is embodied circumferentially on the outer circumference surface of the wheel hub 62 and the transmitting element is embodied circumferentially on the inner circumference surface of the wheel carrier 60. The receiving element can include a receiver coil and the transmitting element can include a transmitter coil. By means of an alternating current in the transmitter coil, an alternating voltage can be induced in the receiver coil so that electrical energy is transmitted wirelessly from the transmitting element to the receiving element, which can then be supplied via the supply line 198 to the wheel-mounted component that is to be supplied. Alternatively to the inductive coupling, a wireless energy transmission can also be implemented in the form of a capacitive coupling between the receiving element and the transmitting element if the receiving element and the transmitting element are suitable for producing a capacitive coupling.

In the case of energy transmission through mechanical contact, the energy collecting element 188 includes a sliding contact and the corresponding energy transmission element 190 includes a stationary contact, which is contacted in sliding fashion by the sliding contact (or vice versa). The sliding contact can take place at the opposing circumference surfaces of the wheel carrier 60 and the wheel hub 62; the sliding contact is positioned at the outer circumference surface of the wheel hub 62 and a stationary contact is embodied by a corresponding circumferential contact surface on the inner circumference surface of the wheel carrier 60 (or vice versa). By means of the sliding contact, the vehicle-mounted energy source 28 can transmit electrical energy to the receiving element 188, which can be supplied via the supply line 198 to the wheel-mounted component that is to be supplied. For example, slip rings or carbon brushes can be used to produce the sliding contact.

By means of the supply line 198, the supply of electrical energy can then be directly conveyed to the wheel-mounted component that is to be supplied. This component can be an energy-consuming component such as the electric motor-driven compressor unit 38, the control module 160, and/or the pressure sensor 174. Alternatively, the component that is to be supplied can also be an energy-storing component, which is connected between an energy-consuming component and the energy collecting element 188. Such an energy-storing component is schematically indicated in FIGS. 16 and 17 as an energy storage device 200, for example, which is positioned adjacent to the compressor unit 38 in the vicinity of the center bore 44 of the vehicle wheel rim 34. The energy storage device 200 can be embodied in the form of a long-term energy storage device or as a short-term energy storage device and can be comprised, for example, by an accumulator or capacitor.

Figure 20:
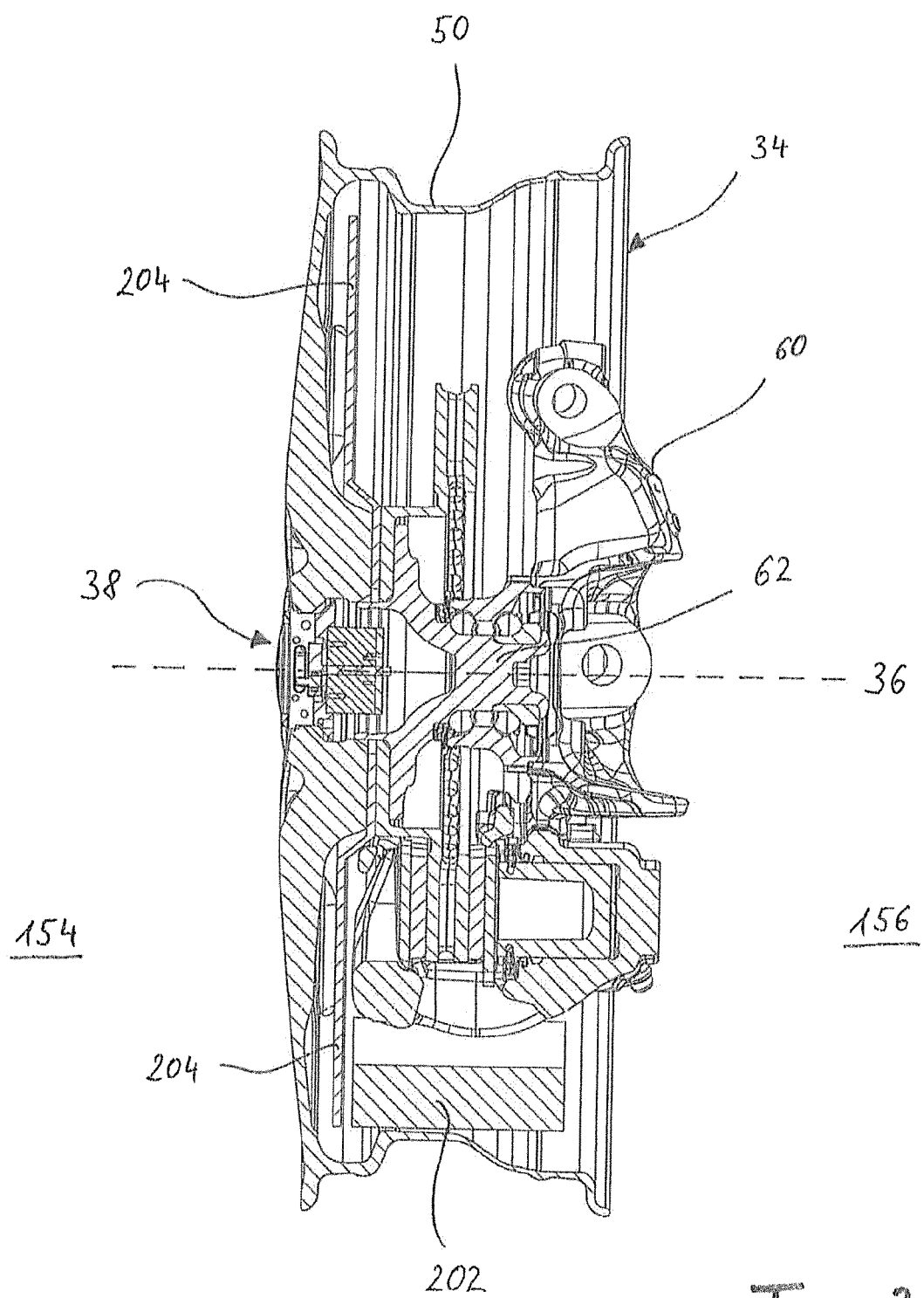
FIG. 20 shows a longitudinal section through a vehicle wheel, which is mounted on a wheel carrier, with an alternative embodiment for the energy transmission.

FIG. 20 shows another exemplary embodiment in which the inductive or capacitive energy transmission is carried out by means of an alternative arrangement of the transmitting element and receiving element. In this example, the transmitting element of the corresponding energy transmission element 190 in the space under the rim well 50 of the vehicle wheel rim 34 is embodied as a block 202 that is fastened, for example, to the brake caliper (the specific fastening to the brake caliper is not shown in FIG. 20) and the receiving element of the energy collecting element 188 is embodied as a disc 204, which is positioned on the inside 156 of the vehicle wheel rim 34 and extends radially relative to the center axis 36 of the vehicle wheel rim 34 and whose radial dimension reaches to the block 202. In the case of an inductive energy transmission, coils are positioned in the block 202 and the disc 204, by means of which an inductive energy transmission can be produced.

Other advantageous embodiments that also fall within the scope of the present disclosure are given below in the form of numbered examples:

Example 1

A decentralized integrated pressurized medium supply device, in particular for supplying compressed air for a vehicle wheel, having a rotatably supported vehicle wheel that includes a tire that can be inflated with a pressurized fluid, having a compressor unit, in particular an electric motor-driven compressor unit, which can be mounted on the vehicle wheel and, together with the vehicle wheel, can be mounted in rotary fashion on a wheel carrier of a vehicle, in which the compressor unit includes a compressor and in an assembled state, is positioned in a central region of the vehicle wheel, between a rim of the vehicle wheel and a wheel hub, and the compressor can be supplied with energy via the wheel carrier of the vehicle in order, in an active operating state, to exert pressure on a pressurized fluid, in particular air, and supply it to the tire.

For each vehicle wheel, a pressurized medium supply device can be provided, which is structurally integrated into the vehicle wheel. The pressurized medium supply device can be structurally positioned at least partially on the wheel body side of the vehicle wheel.

The decentralized integrated medium supply device in particular makes it possible to "shorten" the pressurized medium path, i.e. to shorten pressurized medium lines. If a communication or exchange with central components of the vehicle is required, then this can occur for example by means of electrical lines. If primarily information is exchanged, then it is conceivable for there to be a wireless communication between the pressurized medium supply device and central components of the vehicle. It is thus possible to eliminate (physical) lines.

Even if the communication with central components of the vehicle takes place via electrical lines, it is possible to significantly improve the ruggedness of a system for monitoring and/or adjusting compressed air. In particular, it is possible to reduce the tendency for leaks to develop in the pressurized medium path. In centralized systems for producing compressed air, it is necessary to provide compressed air lines in a web-like or star-like fashion in the region of a chassis of the vehicle. This region, however, is particularly exposed and is potentially subject to harmful environmental conditions. It is therefore advantageous to be able to eliminate a majority of the necessary lines (compressed air lines).

The decentralized compressor unit can in particular include a compressor. In addition, the decentralized compressor unit can include or be coupled to a motor for driving the compressor. Basically, the compressor unit can also be associated with a buffer unit, which for example supplies (electrical) energy for a limited operating time. The term "vehicle" includes land vehicles, but also aircraft, as long as they are provided with landing gear. The pressurized fluid is supplied to the tire via a pressurized medium path.

Example 2

A pressurized medium supply device according to Example 1, in which the compressor unit includes a drive unit and a compressor section having at least one working chamber; the drive unit and the compressor section are axially offset from each other; the compressor section is oriented toward an outer side and the drive unit is oriented toward an inner side; and in the mounted state, the compressor unit is accommodated in at least some sections along its axial dimension in a cylindrical recess, which is embodied in the rim.

At least part of the compressor unit can extend through a center hole in the rim.

Example 3

A pressurized medium supply device according to Example 1 or 2, in which the compressor unit is embodied as modular and includes a module holder and can be inserted from an outer side into the rim; at least part of the compressor unit extends through the central region.

Example 4

A pressurized medium supply device according to Example 3, in which the module holder has a closing cap, which in the assembled state, is oriented toward the outside and is structurally adapted to a bolt circle of the rim.

Example 5

A pressurized medium supply device according to Example 3 or 4, in which the module holder is embodied as a module housing and can be accommodated in a flush manner in the vicinity a center opening of the rim, in particular, can be inserted into the rim.

This preferably relates to a recess or indentation that is accessible from outside of the rim.

Example 6

A pressurized medium supply device according to one of the preceding examples, in which the compressor unit has a compressor shaft, which is oriented parallel to a center axis of the vehicle wheel, with the compressor shaft preferably coinciding with the center axis.

The compressor shaft drives the compressor.

Example 7

A pressurized medium supply device according to Example 6, in which a drive unit of the compressor unit has a longitudinal axis that is oriented parallel to the center axis of the vehicle wheel and preferably coincides with the center axis, and the drive unit is coupled directly or indirectly to the compressor shaft.

Alternative embodiments are conceivable in which the compressor shaft is positioned spaced apart from and parallel to the center axis. It is understood that at least one transmission stage can be positioned between the drive unit and the compressor.

Example 8

A pressurized medium supply device according to one of the preceding examples, in which the compressor unit includes a plurality of working chambers, which are preferably positioned grouped around a center axis of the vehicle wheel and the working chambers are embodied as displacer chambers or displacer cylinders.

Preferably, the working chambers are positioned offset from one another around the center axis, in an approximate star shape, or opposite from one another.

Example 9

A pressurized medium supply device according to one of the preceding examples, in which the compressor unit is embodied as a piston compressor unit and includes at least one piston, in particular a reciprocating piston or rotary piston, which can preferably be driven by means of an eccentric coupling drive.

Preferably, the piston is oriented perpendicular to the center axis. The at least one piston can be embodied as a cylindrical piston. The piston can, however, also be embodied in the form of an oval piston or flat piston and can have a non-circular cross-section. The working chamber is correspondingly adapted to the embodiment of the piston.

Example 10

A pressurized medium supply device according to Example 8 or 9, in which the compressor unit has at least two working chambers embodied as working cylinders, which are positioned around the center axis of the vehicle wheel, and a longitudinal direction of the working cylinders is oriented perpendicular to the center axis.

The working chambers can, for example, be arranged in boxer-like or star-shaped fashion around the center axis.

Example 11

A pressurized medium supply device according to Example 10, in which the compressor unit has at least one double piston, preferably a rigid double piston; the double piston has two piston sections facing away from each other, which are connected to each other via a drive element.

It is thus possible to eliminate an expensive crank mechanism. The eccentric coupling drive can be simply embodied.

Example 12

A pressurized medium supply device according to Example 11, in which the drive element has a sliding guide in which a slider is guided, which revolves in eccentric fashion during operation; the drive element can be driven in translatory fashion by means of the slider in order to compress the pressurized fluid in the working cylinders.

The drive element supporting the pistons is driven in a longitudinally oscillating fashion in at least some embodiments.

Example 13

A pressurized medium supply device according to one of Examples 9 through 12, in which the compressor unit has a plurality of pistons offset from one another axially, which can be driven by means of a shared compressor shaft, which has a plurality of cam sections.

Preferably, several rows of pistons are provided, which are axially offset from one another.

Example 14

A pressurized medium supply device according to one of Examples 9 through 13, in which the at least one piston has an integrated lubricant depot, which has a groove on the piston that is or can be filled with lubricant.

Example 15

A pressurized medium supply device according to Example 14, in which the lubricant depot includes a circumferential groove on the piston, which can be filled with an oil-containing or grease-containing lubricant; the lubricant is released during a sliding motion of the piston in order to lubricate sliding surfaces of the piston and the working chamber; and the lubricant is preferably embedded in a porous or absorbent matrix.

Example 16

A pressurized medium supply device according to Example 9, in which the piston compressor unit has at least one rotary piston in the form of a Wankel piston, which rotates around an axis that is oriented parallel to the center axis of the vehicle wheel.

The rotary piston executes an eccentric circular motion. The rotary piston can be driven by the drive unit indirectly via a gear step. It is understood that other types of rotary piston are alternatively also conceivable. In a sample modification of this embodiment, two or more rotary pistons are provided, which are axially offset from one another.

Example 17

A pressurized medium supply device according to one of the preceding examples, also including a sealant reservoir for a tire sealant, in which the pressurized medium supply device is embodied to introduce the tire sealant and the pressurized fluid into the tire in the event of a pressure drop in the tire.

Example 18

A pressurized medium supply device according to Example 17, in which the sealant reservoir has an annular chamber or annular section-shaped chamber that contains the tire sealant; the chamber is preferably oriented concentric to the center axis of the vehicle wheel and encompasses at least sections of the compressor unit.

Example 19

A pressurized medium supply device according to Example 17 or 18, also having an on/off valve, preferably a multi-port valve, which is situated in the pressurized medium path between the compressor unit and the tire, in which the on/off valve triggers a discharge of the tire sealant from the sealant reservoir as needed.

The on/off valve can be coupled to a corresponding actuator, for example a solenoid actuator. The on/off valve can be activated if a sudden pressure drop is detected in the tire.

Example 20

A pressurized medium supply device according to one of Examples 17 through 19, in which in addition to the pressurized medium path for the pressurized fluid, a sealant path for the sealant is provided; the pressurized medium path and the sealant path feed into the tire via a common inflation valve or via separate valves; and the sealant path can be activated by means of an on/off valve in addition or alternatively to the pressurized medium path.

Alternatively, the sealant can be conveyed into the tire via the pressurized medium path.

Example 21

A pressurized medium supply device according to Example 20, in which the sealant path, at least in some sections, is embodied as a reservoir for the tire sealant.

Example 22

A pressurized medium supply device according to one of Examples 17 through 20, in which the sealant reservoir is embodied as an interchangeable part and can be replaced as needed and preferably, other tire sealant-conveying parts are embodied as replaceable in order to restore the pressurized medium supply device to an original state after a use of the sealant.

This can also be true of other components, which come into contact with the tire sealant when the pressurized medium supply device reacts to a sudden pressure drop.

Example 23

A pressurized medium supply device according to one of the preceding examples, in which the compressor unit can be supplied with energy via the wheel carrier, particularly even when the vehicle is in the driving state, and preferably, a contactless energy transmission (i.e. without mechanical contact) is enabled.

The energy transmission can take place in an inductive fashion. The energy transmission can include a transmission of direct current or a transmission of alternating current. The energy transmission can also include a director current/alternating current conversion or vice versa. It is also conceivable to use slip ring contacts, brush contacts, or the like. An energy transmission by generator using the relative motion of the vehicle wheel is also conceivable.

According to another embodiment, the pressurized medium supply device also has an integrated energy storage device or energy buffer for electrical energy.

Example 24

A pressurized medium supply device according to one of the preceding examples, also including an external connection for electrical energy, in particular for providing an emergency supply, in which the external connection is preferably embodied as a plug connection and is oriented toward the outside.

The connection can be positioned adjacent to the closing cap or can be covered by it.

Example 25

A pressurized medium supply device according to one of the preceding examples, also including an external refill valve, in particular a bypass valve for an emergency operation, in which the refill valve is coupled to the pressurized medium path and can be connected to external pressurized fluid sources.

The refill valve can be positioned adjacent to the closing cap or can be covered by it.

Example 26

A vehicle wheel rim having a pressurized medium supply device according to one of the preceding examples and having a pressurized medium path, which extends between the compressor unit and a mounting region for a tire, in which the pressurized medium path is integrated into the rim and preferably is embodied, at least in some sections, as an integral component of the rim.

Example 27

A vehicle wheel rim according to Example 26, in which the pressurized medium path is produced, at least in some sections, in an integral form, particularly by means of sliders in a casting tool; the pressurized medium path is preferably composed by means of a conduit, which, at least in sections, extends radially in the vehicle wheel rim.

Example 28

A vehicle wheel rim according to Example 26 or 27, in which the pressurized medium path, at least in sections, extends radially along a rim arm and a seat for an internal inflation valve adjoins the pressurized medium path in the vicinity of a shoulder or well of the rim.

Example 29

A vehicle wheel rim according to one of Examples 26 through 28, also including a tire sensor, in particular a pressure sensor, in which the pressure sensor can be connected via a signal line to the pressurized medium supply device in order to transmit a pressure signal to the pressurized medium supply device and the signal line, at least in some sections, is associated with the pressurized medium path, preferably being integrated, at least in some sections, into the pressurized medium path.

The pressure sensor can be as a combined pressure/temperature sensor.

Example 30

A vehicle wheel rim according to one of Examples 26 through 29, also includes a seat for an external refill valve, in particular a bypass valve for an emergency operation, in which the refill valve is coupled to the pressurized medium path and can be connected to external pressurized fluid sources; and the refill valve is preferably embodied as concealed, in particular behind a flap or closing cap, or is embodied oriented away from the outside on an inside of a rim arm.

According to another embodiment of the vehicle wheel rim, the rim includes an external refill valve, in particular a bypass valve for an emergency operation, in which the refill valve is coupled to the pressurized medium path and can be connected to external pressurized fluid sources.

Example 31

An integrated pressurized medium supply system for a vehicle, particular for multi-axle land vehicle, having at least two vehicle wheels, which are provided with a pressurized medium supply device according to one of Examples 1 through 25.

Example 32

A vehicle with an integrated pressurized medium supply system according to Example 31, which also has a central control unit for controlling at least one pressurized medium supply device of the pressurized medium supply system.

The control unit permits a central control of the decentralized, distributed pressurized medium supply system.

The invention claimed is:

1. A compressor unit (38) for supplying fluid medium to a tire (54) mounted on a vehicle wheel rim (34) comprising:
   a compressor (58) for exerting pressure on a fluid medium that is to be conveyed into the tire (54), the compressor comprising a reciprocating piston having opposing piston ends fixed together and each within a working chamber, wherein the reciprocating piston is embodied as a double piston, which has two opposing piston sections (88-1 and 88-2) that are accommodated so that they are each able to move in a cylinder (92);
   a drive unit (56) driving the compressor (58); and
   an eccentric coupling connecting the drive unit (56) to the reciprocating piston, wherein the reciprocating piston includes a sliding guide extending perpendicular to a reciprocation direction of the reciprocating piston, and the eccentric coupling comprises a slider movable within the sliding guide;
   wherein the compressor unit (38) is dimensioned to be accommodated in a center bore (44) of the vehicle wheel rim (34) when the vehicle wheel rim (34) is in the mounted state on a wheel hub (62), with the drive unit (56) positioned in the vicinity of the center bore (44) of the vehicle wheel rim (34).

2. The compressor unit (38) according to claim 1, wherein the compressor unit (38) is embodied as modular and includes a module housing (64) for a precisely fit placement in the vicinity of the center bore (44) of the vehicle wheel rim (34).

3. The compressor unit (38) according to claim 2, wherein the module housing (64) is configured to insert into the center bore (44) of the vehicle wheel rim (34).

4. The compressor unit (38) according to claim 2, wherein the height of the module housing (64) is smaller than its diameter.

5. The compressor unit (38) according to claim 1, wherein the compressor unit (38) includes a longitudinal axis, which in the state in which the compressor unit (38) is accommodated in the center bore (44) of the vehicle wheel rim (34), coincides with a center axis (36) of the vehicle wheel rim (34).

6. The compressor unit (38) according to claim 1, wherein the drive unit (56) is part of the compressor unit (38) and includes an electric motor (72).

7. The compressor unit (38) according to claim 1, wherein the reciprocating piston is embodied as a flat piston.

8. The compressor unit (38) according to claim 7, wherein the flat piston is arranged, in relation to a longitudinal axis of the compressor unit (38) in the compressor (58), so that its radial dimension is greater than its axial dimension.

9. The compressor unit (38) according to claim 7, wherein in the state in which the compressor unit (38) is accommodated in the center bore (44) of the vehicle wheel rim (34), a movement direction of the reciprocating piston (86; 140) extends perpendicular to a center axis (36) of the vehicle wheel rim (34).

10. The compressor unit (38) according to claim 7, wherein the eccentric coupling comprises an of an eccentric coupling drive (82) in which an eccentric (76) connected to a drive shaft (74) is coupled to the reciprocating piston (86).

11. The compressor unit (38) according to claim 10, wherein a longitudinal axis of the drive shaft (74) coincides with a center axis (36) of the vehicle wheel rim (34).

12. The compressor unit (38) according to claim 7, wherein the reciprocating piston is accommodated in moving fashion in the cylinder (92).

13. The compressor unit (38) according to claim 12, wherein the cylinder (92) is formed by the module housing (64).

14. The compressor unit (38) according to claim 12, wherein an intake valve (95) and/or an exhaust valve (96) of the compressor (58) is at least partially embedded in the cylinder (92).

15. The compressor unit (38) according to claim 12, wherein an intake valve (95) of the compressor (58) includes a sealing element (122), which is mounted on the reciprocating piston and is forced open by the movement of the reciprocating piston during its intake stroke.

16. The compressor unit (38) according to claim 12, wherein the reciprocating piston has a lubricant depot (112) for lubricating the reciprocating piston in the cylinder (92).

17. The compressor unit (38) according to claim 1, wherein the compressor (58) includes at least two working chambers (94).

18. The compressor unit (38) according to claim 1, wherein the double piston has a length that is a multiple of its width.

19. A vehicle wheel rim (34) comprising:
a pressurized medium supply device (22) for the tire (54) mounted on the vehicle wheel rim (34), wherein the pressurized medium supply device (22) includes the compressor unit (38) according to claim 1 accommodated in the center bore (44) of the vehicle wheel rim (34).

20. The vehicle wheel rim (34) according to claim 19, wherein the pressurized medium supply device (22) includes a pressurized medium path (162), which extends from the compressor unit (38) to a pressurized medium inlet into the tire (54).

21. The vehicle wheel rim (34) according to claim 20, wherein a check valve positioned on the compressor unit (38) is integrated into the pressurized medium path (162).

22. The vehicle wheel rim (34) according to claim 20, wherein the pressurized medium path (162), at least in some sections, is routed in the form of a conduit inside a spoke (48) of the vehicle wheel rim (34).

23. The vehicle wheel rim (34) according to claim 20, wherein a tire valve that can be connected to an external pressurized medium source is coupled to the pressurized medium path (162).

24. The vehicle wheel rim (34) according to claim 19, wherein the pressurized medium supply device (22) can be supplied with energy from a vehicle-mounted energy source (28) when the vehicle wheel rim (34) is in the mounted state on the wheel hub (62) of a vehicle (10).

25. The vehicle wheel rim (34) according to claim 19, wherein a sensor device (174) is positioned on the vehicle wheel rim (34) and is connected via a signal line (176) to the pressurized medium supply device (22).

26. The vehicle wheel rim (34) according to claim 25, wherein the signal line (176), at least in some sections, is routed inside a pressurized medium path (162).

27. The vehicle wheel rim (34) according to claim 19, wherein the pressurized medium supply device (22) includes a control module (160) for controlling the drive unit (56) of the compressor unit (38).

28. The vehicle wheel rim (34) according to claim 19, wherein a connection (170), via which the pressurized medium supply device (22) can be supplied with energy and which can be connected to an external energy source, is positioned on the vehicle wheel rim (34).

29. The vehicle wheel rim (34) according to claim 19, wherein the pressurized medium supply device (22) includes a sealant reservoir (178) for storing a tire sealant (180).

30. The vehicle wheel rim (34) according to claim 29, wherein the sealant reservoir (178) includes an annular chamber positioned in the center bore (44) of the vehicle wheel rim (34) and is encompassing the compressor unit (38).

31. The vehicle wheel rim (34) according to claim 29, wherein the sealant reservoir (178) is a cavity in a spoke (48) of the vehicle wheel rim (34).

32. The vehicle wheel rim (34) according to claim 29, wherein an on/off valve (182) is integrated into the pressurized medium path (162), via which the tire sealant (180) can be conveyed from the sealant reservoir (178) into a pressurized medium path (162).

33. The vehicle wheel rim (34) according to claim 29, wherein the pressurized medium supply device (22) includes a separate sealant path, which extends from the sealant reservoir (178) to a sealant inlet into the tire (54).

34. A vehicle (10) having at least one vehicle wheel (16), which includes a vehicle wheel rim (34) according to claim 19.

35. The vehicle (10) according to claim 34, wherein a pressurized medium supply device (22) of the vehicle wheel rim (34) of the at least one vehicle wheel (16) can be controlled by a control unit (24) positioned in the vehicle (10).

36. A compressor unit (38) for supplying fluid medium to a tire (54) mounted on a vehicle wheel rim (34) comprising:
a compressor (58) for exerting pressure on a fluid medium that is to be conveyed into the tire (54), the compressor comprising a plurality of reciprocating pistons (86-1 and 86-2) that are positioned one after another along a longitudinal axis of the compressor unit (38) and each of the plurality of reciprocating pistons (86-1 and 86-2) having opposing piston ends fixed together and each within a working chamber;
a drive unit (56) driving the compressor (58); and
an eccentric coupling connecting the drive unit (56) to the reciprocating piston, wherein each of the reciprocating pistons includes a sliding guide extending perpendicular to a reciprocation direction of the reciprocating piston, and the eccentric coupling comprises a slider movable within the sliding guide;

wherein the compressor unit (38) is dimensioned to be accommodated in a center bore (44) of the vehicle wheel rim (34) when the vehicle wheel rim (34) is in the mounted state on a wheel hub (62), with the drive unit (56) positioned in the vicinity of the center bore (44) of the vehicle wheel rim (34).

37. The compressor unit (38) according to claim 36, wherein the plurality of reciprocating pistons (86-1 and 86-2) are driven by a common drive shaft (74).

38. The compressor unit (38) according to claim 36, wherein the compressor unit (38) is embodied as modular and includes a module housing (64) for a precisely fit placement in the vicinity of the center bore (44) of the vehicle wheel rim (34).

39. The compressor unit (38) according to claim 38, wherein the module housing (64) is configured to insert into the center bore (44) of the vehicle wheel rim (34).

40. The compressor unit (38) according to claim 36, wherein the compressor unit (38) includes a longitudinal axis, which in the state in which the compressor unit (38) is accommodated in the center bore (44) of the vehicle wheel rim (34), coincides with a center axis (36) of the vehicle wheel rim (34).

41. The compressor unit (38) according to claim 36, wherein each of the plurality of reciprocating pistons (86-1 and 86-2) is embodied as a flat piston.

42. A compressor unit (38) for supplying fluid medium to a tire (54) mounted on a vehicle wheel rim (34) comprising:
a compressor (58) for exerting pressure on a fluid medium that is to be conveyed into the tire (54), the compressor comprising a reciprocating piston having opposing piston ends fixed together and each within a working chamber;
a drive unit (56) driving the compressor (58); and
an eccentric coupling connecting the drive unit (56) to the reciprocating piston;
wherein the reciprocating piston includes a sliding guide (104) extending perpendicular to a reciprocation direction of the reciprocating piston, and the eccentric coupling comprises a slider movable within the sliding guide; and
wherein the compressor unit (38) is dimensioned to be accommodated in a center bore (44) of the vehicle wheel rim (34) when the vehicle wheel rim (34) is in the mounted state on a wheel hub (62), with the drive unit (56) positioned in the vicinity of the center bore (44) of the vehicle wheel rim (34).

43. The compressor unit (38) according to claim 42, wherein the reciprocating piston is embodied as a double piston, which has two opposing piston sections (88-1 and 88-2) that are accommodated so that they are each able to move in a cylinder (92).

44. The compressor unit (38) according to claim 42, wherein the compressor unit (38) includes a longitudinal axis, which in the state in which the compressor unit (38) is accommodated in the center bore (44) of the vehicle wheel rim (34), coincides with a center axis (36) of the vehicle wheel rim (34).

45. The compressor unit (38) according to claim 42, wherein the drive unit (56) is part of the compressor unit (38) and includes an electric motor (72).

46. The compressor unit (38) according to claim 42, wherein the reciprocating piston is embodied as a flat piston.

47. The compressor unit (38) according to claim 46, wherein the flat piston is arranged, in relation to a longitudinal axis of the compressor unit (38) in the compressor (58), so that its radial dimension is greater than its axial dimension.

48. The compressor unit (38) according to claim 46, wherein in the state in which the compressor unit (38) is accommodated in the center bore (44) of the vehicle wheel rim (34), a movement direction of the reciprocating piston (86) extends perpendicular to a center axis (36) of the vehicle wheel rim (34).

49. The compressor unit (38) according to claim 46, wherein the slider is connected to a drive shaft (74) of the drive unit.

50. The compressor unit (38) according to claim 49, wherein a longitudinal axis of the drive shaft (74) coincides with a center axis (36) of the vehicle wheel rim (34).

51. The compressor unit (38) according to claim 42, wherein the compressor unit (38) is embodied as modular and includes a module housing (64) for a precisely fit placement in the vicinity of the center bore (44) of the vehicle wheel rim (34).

52. The compressor unit (38) according to claim 51, wherein the module housing (64) is configured to insert into the center bore (44) of the vehicle wheel rim (34).

53. The compressor unit (38) according to claim 42, wherein the drive unit (56) is within the center bore (44) of the vehicle wheel rim (34).

* * * * *